US007961948B2

(12) United States Patent
Katsuyama

(10) Patent No.: US 7,961,948 B2
(45) Date of Patent: Jun. 14, 2011

(54) COMPUTER-READABLE RECORD MEDIUM IN WHICH A TELOP CHARACTER EXTRACTION PROGRAM IS RECORDED, TELOP CHARACTER EXTRACTION METHOD AND TELOP CHARACTER EXTRACTION APPARATUS

(75) Inventor: Yutaka Katsuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 807 days.

(21) Appl. No.: 12/021,611

(22) Filed: Jan. 29, 2008

(65) Prior Publication Data

US 2008/0187225 A1  Aug. 7, 2008

(30) Foreign Application Priority Data

Feb. 5, 2007  (JP) .................................. 2007-025259

(51) Int. Cl.
*G06K 9/18* (2006.01)
(52) U.S. Cl. .......................... 382/182; 382/168; 382/199
(58) Field of Classification Search .................... 382/182
See application file for complete search history.

(56) References Cited

U.S. PATENT DOCUMENTS

| 6,148,103 | A  | * | 11/2000 | Nenonen | 382/169 |
|---|---|---|---|---|---|
| 6,366,699 | B1 | * | 4/2002 | Kuwano et al. | 382/199 |
| 6,501,856 | B2 | * | 12/2002 | Kuwano et al. | 382/194 |
| 6,754,385 | B2 | * | 6/2004 | Katsuyama | 382/171 |
| 7,136,527 | B2 | * | 11/2006 | Ikeda et al. | 382/190 |
| 7,519,264 | B2 | * | 4/2009 | Miyasato et al. | 386/239 |
| 2002/0085116 | A1 | * | 7/2002 | Kuwano et al. | 348/465 |
| 2004/0228616 | A1 | * | 11/2004 | Miyasato et al. | 386/83 |
| 2004/0257477 | A1 | * | 12/2004 | Ikeda et al. | 348/725 |
| 2008/0187225 | A1 | * | 8/2008 | Katsuyama | 382/190 |

FOREIGN PATENT DOCUMENTS

| JP | A 2000-182053 | 6/2000 |
|---|---|---|
| JP | A 2001-285716 | 10/2001 |

OTHER PUBLICATIONS

Nobuyuki Otsu, "A Threshold Selection Method from Gray-Level Histograms," IEEE Transactions on Systems, Man, and Cybernetics, vol. SMC-9, No. 1, Jan. 1979, pp. 62-66.

* cited by examiner

*Primary Examiner* — Sath V Perungavoor
(74) *Attorney, Agent, or Firm* — Greer, Burns & Crain, Ltd.

(57) ABSTRACT

A telop character extraction apparatus generates a gray-scale image from a telop region image, and generates an edge region image where an edge is extracted from within the gray-scale image. The apparatus uses the edge region image as a mask image, and creates a luminance histogram of pixels of the gray-scale image. The apparatus divides a luminance of the luminance histogram into luminance classes. The apparatus generates binary images where pixels of luminances belonging to the individual classes are collected for the respective luminance classes, and selects the binary image of the class of maximum area, as a telop character candidate image. The apparatus decides on a character color used in the telop region image, in correspondence with the telop character candidate image, and extracts character pixels corresponding to the character color, from within the telop character candidate image, thereby to eliminate noise pixels and to generate telop character image.

19 Claims, 22 Drawing Sheets

68  TELOP REGION IMAGE

70  GRAY-SCALE IMAGE

72  EDGE BINARY IMAGE

74  INFLATED IMAGE

108 TELOP REGION IMAGE

110 GRAY-SCALE IMAGE

112 EDGE BINARY IMAGE

114 INFLATED IMAGE

COMPUTER-READABLE RECORD MEDIUM IN WHICH A TELOP CHARACTER EXTRACTION PROGRAM IS RECORDED, TELOP CHARACTER EXTRACTION METHOD AND TELOP CHARACTER EXTRACTION APPARATUS

BACKGROUND OF THE INVENTION

1. Technical Field

The present invention relates to a field in which telop characters in a video image are extracted in order to utilize them for a video retrieval text or the like. More particularly, it relates to a field in which a binary character pattern for use in character recognition is extracted from a telop region in a video image.

2. Description of the Related Art

In recent years, a DVD apparatus and an HDD video apparatus each of which can record a large number of programs have come into wide use in order to view a multiplicity of channels. As a result, there have risen needs for retrieving favorite contents from among the large quantity of recorded videos.

For such retrieval from among the large quantity of videos, it is required to automatically extract and textize telop characters in a video image.

As a related-art method for extracting and textizing the telop character, it is assumed that the telop character has the highest luminance in a frame image, and only the pixels of a peak part at which a luminance distribution is the highest are extracted from within a telop region and are outputted as constituting a telop character pattern (refer to JP-A-2000-182053).

In another method, candidate patterns are created by various techniques, the respective candidate patterns are subjected to character recognitions, and a specified one of the candidate patterns is selected as telop information in accordance with recognition reliabilities exhibited till the character is recognized (JP-A-2001-285716). In this method, as a process in which pixels constituting a telop character are extracted from the background, the luminance histogram of an edge inflation region is obtained. Luminance peaks are obtained for a telop and the edge and background of the telop, and a distribution of the highest peak is identified as the distribution of the telop character, thereby to extract the candidate pattern.

However, the telop character extraction of JP-A-2000-182053 extracts the pixels assuming that the telop character has the highest luminance in the frame image. Therefore, it has the problem that a telop character of low luminance cannot be recognized.

The extraction of the telop character according to JP-A-2001-285716 selects the telop information from among the character recognition results of the plurality of candidate patterns obtained for a telop region, in accordance with the recognition reliabilities. It does not extract one telop character pattern from within a frame image for the purpose of character recognition, and processing becomes complicated.

Besides, the method of JP-A-2001-285716 extracts the distribution of the highest peak in the luminance histogram of the edge inflation region, as the distribution of the telop character in order to extract the pixels constituting the telop character from the background. This results in the problem that a telop character of low luminance cannot be recognized.

Therefore, the present invention has for its object to provide telop character extraction in which a telop character pattern is extracted at a high precision without depending upon the luminance of a telop character, and even telop characters of low luminance and medium luminance are extracted, whereby a recognition rate can be enhanced.

SUMMARY

According to an aspect of an embodiment, a telop character extraction apparatus includes an image input unit for receiving a telop region image which contains telop characters cut out from color image data. A gray-scale image generation unit generates a gray-scale image from the telop region image, and an edge region extraction unit generates an edge region image where an edge is extracted from within the gray-scale image and is inflated. A histogram creation unit uses the edge region image as a mask image, and creates a luminance histogram of pixels of the gray-scale image. A luminance class generation unit divides a luminance of the luminance histogram into a plurality of luminance classes. A character pattern candidate selection unit generates binary images where pixels of luminances belonging to the individual classes are collected for the respective luminance classes, and selects the binary image of the class of maximum area, as a telop character candidate image. A noise elimination unit decides on a character color used in the telop region image, in correspondence with the telop character candidate image, and extracts character pixels corresponding to the character color, from within the telop character candidate image, thereby to eliminate noise pixels and to generate a telop character image.

DETAILED DESCRIPTION OF THE EMBODIMENT

Figure 1:
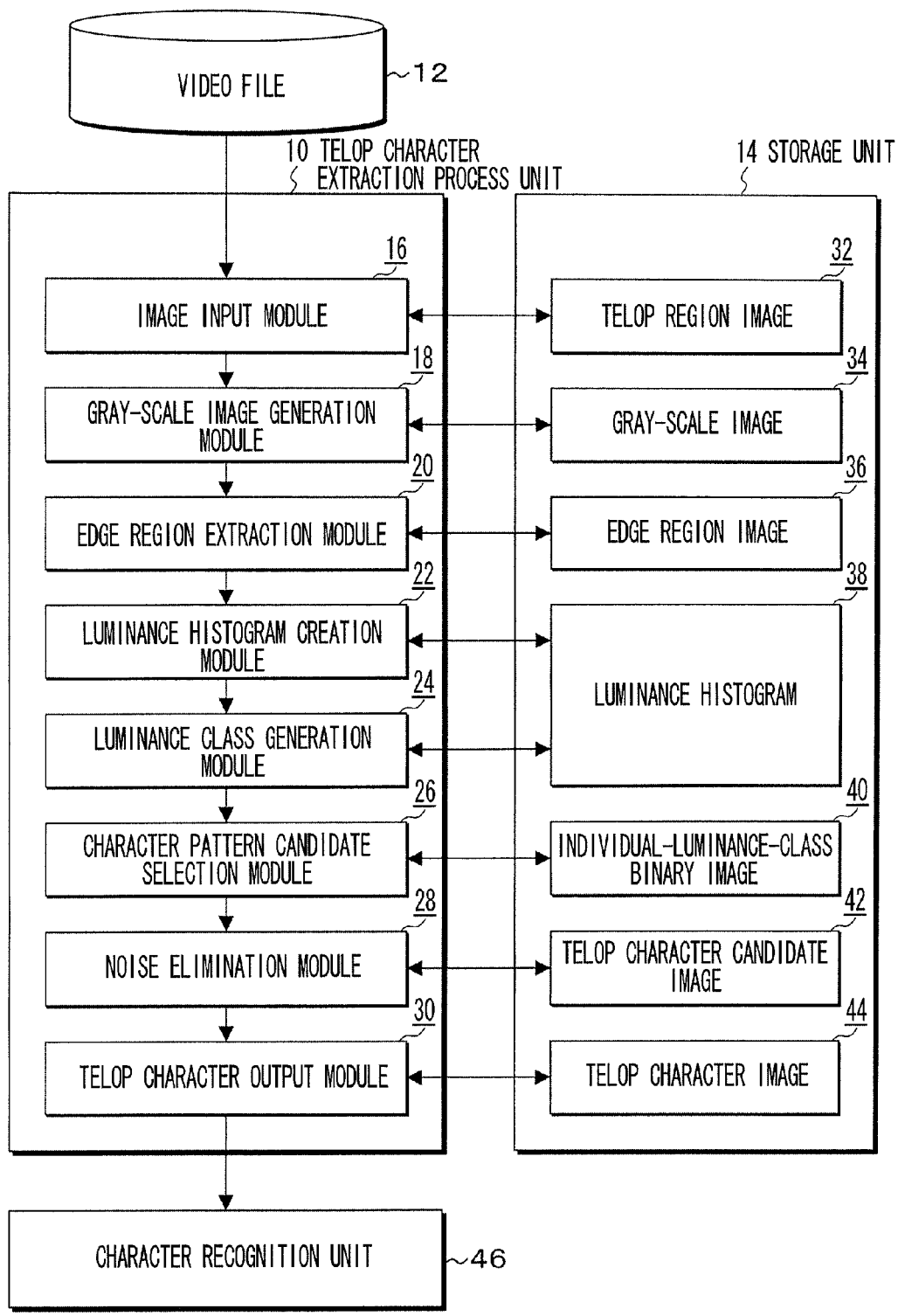
FIG. 1 is a block diagram showing a functional configuration in a telop character extraction apparatus in an embodiment of the present invention.

FIG. 1 is a block diagram showing a functional configuration in a telop character extraction apparatus in an embodiment. Referring to FIG. 1, the telop character extraction apparatus of this embodiment is configured of a telop character extraction process unit 10, a video file 12 and a storage unit 14.

The video file 12 stores therein videos or the images of a DVD or the like, for example, the images of the MPEG2, which are the aggregate of frame images containing telop images to-be-processed.

The telop character extraction process unit 10 is provided with the functions of an image input module 16, a gray-scale image generation module 18, an edge region extraction module 20, a luminance histogram creation module 22, a luminance class generation module 24, a character pattern candidate selection module 26, a noise elimination module 28 and a telop character output module 30. These functions are implemented by a telop character extraction program run by a computer.

As data which are generated and processed by the respective functions of the telop character extraction process unit 10, a telop region image 32, a gray-scale image 34, an edge region image 36, a luminance histogram 38, an individual-luminance-class binary image 40, a telop character candidate image 42 and a telop character image 44 are generated and stored in the storage unit 14 in the order of processing.

The telop character image extracted by the telop character extraction process unit 10 is outputted to a character recognition unit 46, in which the telop character image is subjected to character recognition by an OCR process, thereby to be textized.

Next, the respective functions of the telop character extraction process unit 10 will be described. The image input module 16 receives the telop region image 32 which contains a telop character cut out from the frame image being the color image of the video file 12, and stores this telop region image in the storage unit 14.

The cutout of the telop character region image from the color image can be done by the automatic cutout of a region containing the telop character or the designation of a region by a user. As the automatic cutout of the telop region image, by way of example, a region which contains a part having no luminance change, among a plurality of frames at the head part of a video stream may be cut out in a rectangular shape so as to be inputted as the telop image.

The gray-scale image generation module 18 generates the gray-scale image 34 from the telop region image 32. Since the individual pixels of the telop region image 32 are formed of RGB data, the gray-scale image 34 is created by, for example, the following formula:

$$G = r*0.299 + g*0.587 + b*0.114 \tag{1}$$

The edge region extraction module 20 generates the edge region image 36 in which an edge is extracted from the gray-scale image 34 and is inflated. The luminance histogram creation module 22 uses the edge region image 36 as a mask image, and generates the luminance histogram 38 of those pixels of the gray-scale image 34 which belong to the mask image.

The luminance class generation module 24 classifies the luminance of the luminance histogram 38 into multivalued classes by setting one or more threshold values, thereby to divide the luminance into the plurality of luminance classes. In this embodiment, the luminance histogram 38 is classified into 2 classes or 3 classes. In case of the 2-class classification, the luminance histogram 38 is divided in two into a low luminance class and a high luminance class, and in case of the 3-class classification, the luminance histogram 38 is divided in three into a low luminance class, a medium luminance class and a high luminance class.

The character pattern candidate selection module 26 generates the individual-luminance-class binary image 40 in which pixels belonging to the luminance classes are collected for the respective luminance classes into which the luminance histogram 38 has been divided, and it selects a binary image of the class of the maximum area, as the telop character candidate image 42.

The noise elimination module 28 decides on a character color used in the telop region image 32, in correspondence with the telop character candidate image 42. This noise elimination module 28 extracts a character image corresponding to the decided character color, from within the telop character candidate image 42, thereby to eliminate character pixels in any color other than the decided character color, as noise pixels and to generate the telop character image 44 being binary image data.

The telop character output module 30 outputs the telop character image 44 generated by the noise elimination module 28, to the character recognition unit 46, so as to textize this telop character image by the OCR process and to utilize it for the search of a video file not shown.

Figure 2:
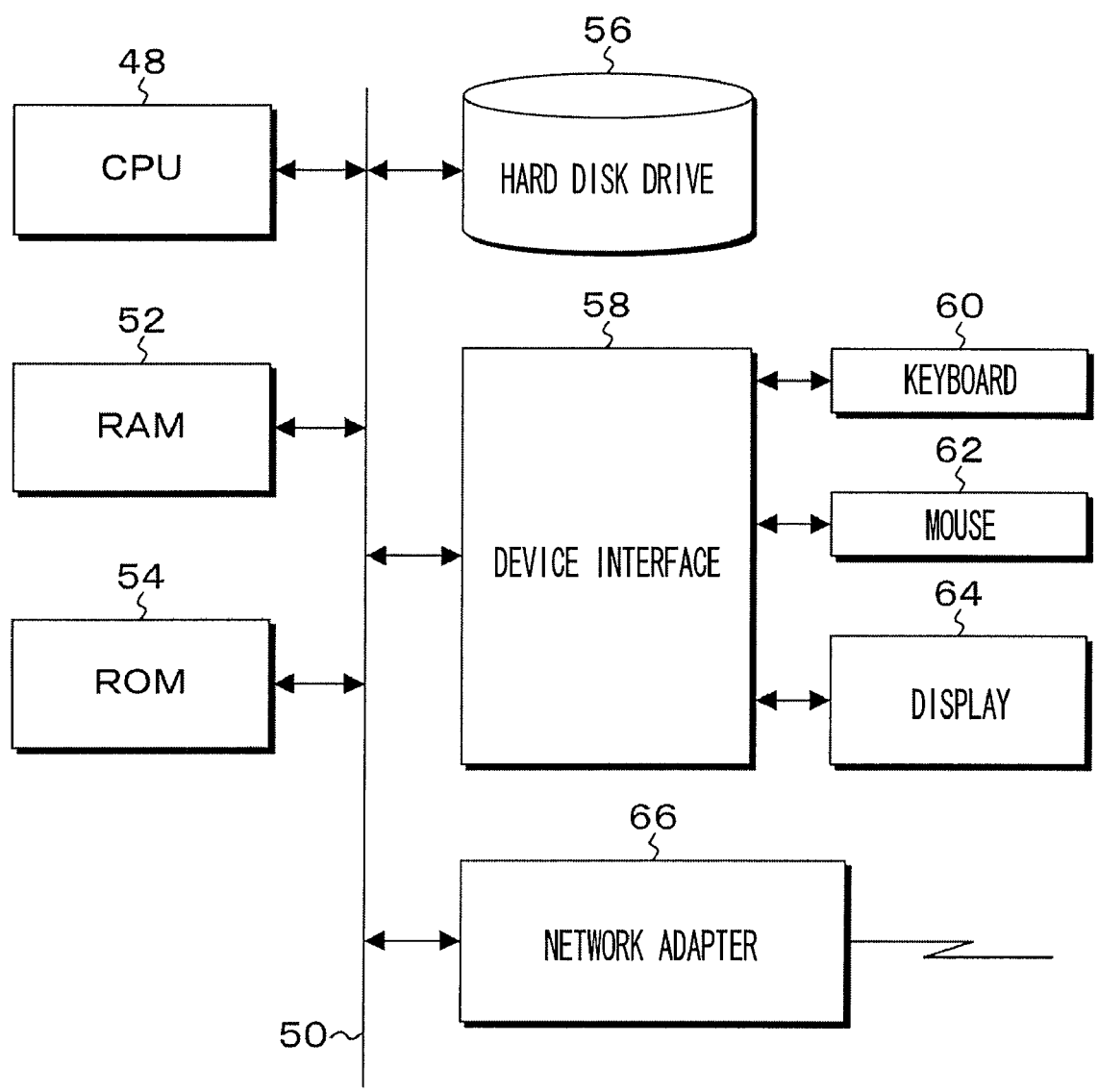
FIG. 2 is a block diagram showing the hardware environment of a computer in which programs used in the embodiment are run.

FIG. 2 is a block diagram showing that hardware environment of a computer in which the programs that implement the respective functions of the telop character extraction process unit 10 in FIG. 1 are run.

In the computer in FIG. 2, a RAM 52, a ROM 54, a hard disk drive 56, a device interface 58 for connecting a keyboard 60, a mouse 62 and a display 64 thereto, and a network adapter 66 are connected to the bus 50 of a CPU 48.

The telop character extraction program according to this embodiment is loaded in the hard disk drive 56. When the computer is started, an OS is fetched and located into the RAM 52 by boot-up based on the BIOS of the ROM 54. Subsequently, the telop character extraction program of this embodiment is read out from the hard disk drive 56 and is stored in the RAM 52 by the execution of the OS. Thereafter, the telop character extraction program is run by the CPU 48.

Figure 3:
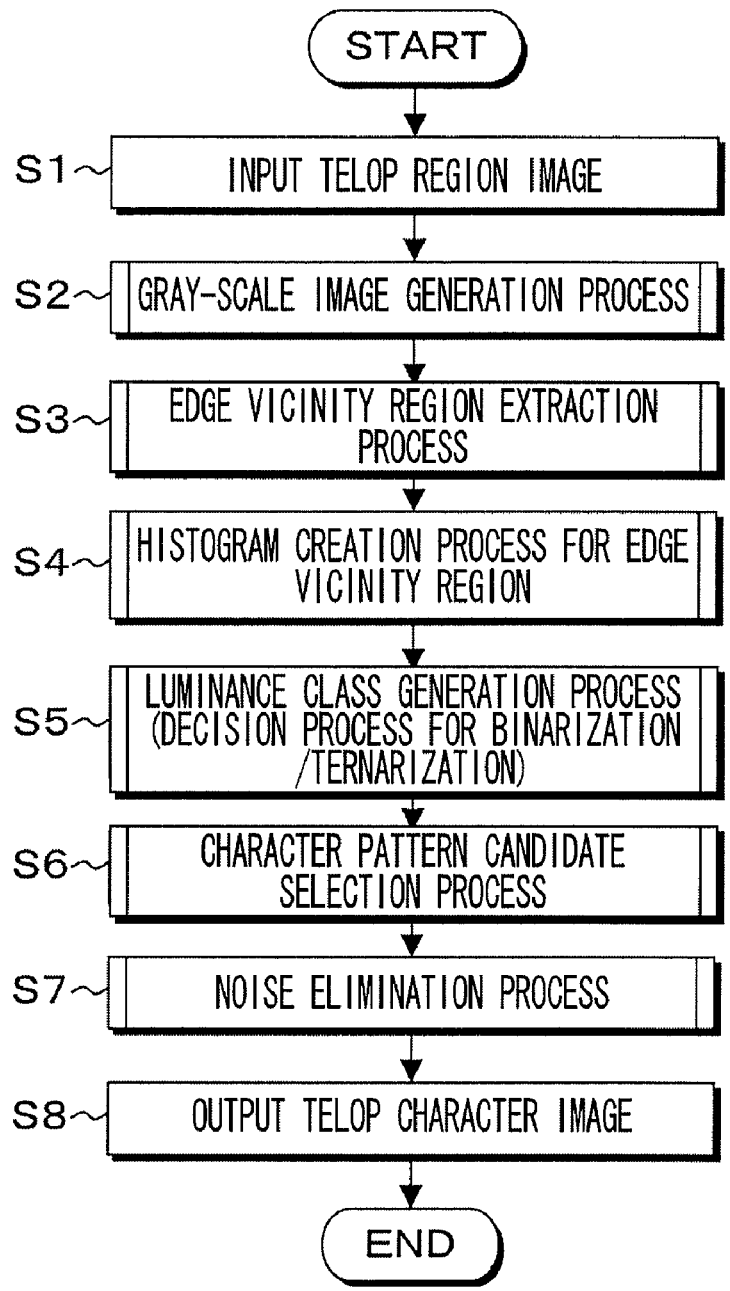
FIG. 3 is a flow chart showing the steps of a telop character extraction process according to the embodiment.

FIG. 3 is a flow chart showing the steps of a telop character extraction process according to this embodiment in FIG. 1, and it simultaneously represents the contents of the telop character extraction process program in this embodiment.

Referring to FIG. 3, the telop character extraction process first receives the telop region image cut out from the video file 12 by the image input module 16 at a step S1, so as to store the received image as the telop region image 32 in the storage unit 14. Subsequently, at a step S2, the gray-scale image generation module 18 generates the gray-scale image 34 from the RGB image data of the telop region image 32 in conformity with Formula (1).

Subsequently, at a step S3, the edge region extraction module 20 extracts an edge from the gray-scale image 34 and generates the inflated edge region image 36. At the next step S4, the luminance histogram creation module 22 uses the edge region image 36 as a mask image and creates the luminance histogram 38 of those pixels of the gray-scale image 34 which belong to the mask image.

Next, at a step S5, the luminance class generation module 24 classifies the luminance of the luminance histogram 38 into multivalued classes, thereby to generate the luminance classes divided into, for example, 2 classes or 3 classes.

Subsequently, at a step S6, the character pattern candidate selection module 26 generates the individual-luminance-class binary image 40 in which pixels belonging to the luminance classes are collected for the respective luminance classes, and it selects the binary image of the class in which the area, in other words, the number of character pixels of the generated binary image becomes the maximum, as the telop character candidate image 42.

Subsequently, at a step S7, the noise elimination module 28 chooses a character color used in the telop region image 32, in correspondence with the telop character candidate image 42. Then, the noise elimination module 28 extracts a character image corresponding to the decided character color, from within the telop character candidate image 42, and it eliminates pixels in any other character color, as noise pixels, thereby to generate the telop character image 44. Finally, at a step S8, the telop character output module 30 outputs the telop character image 44 so as to textize this image by character recognition.

Figure 4:
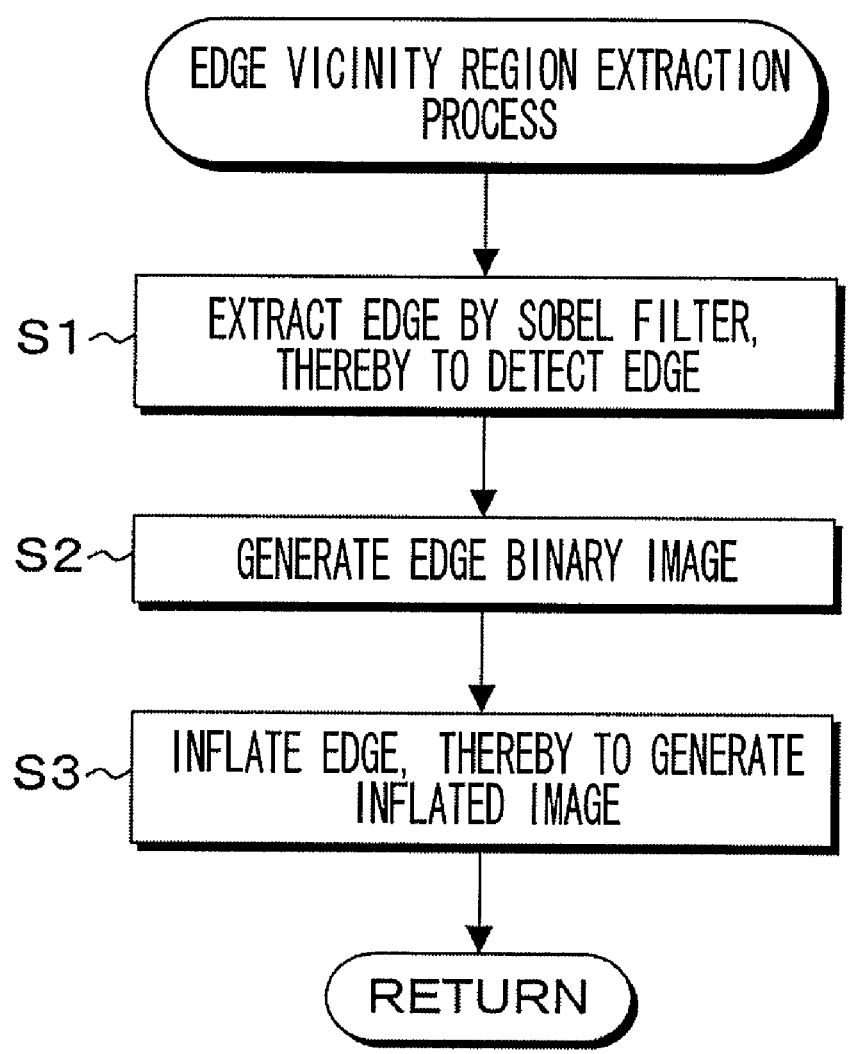
FIG. 4 is a flow chart showing the details of an edge vicinity region extraction process at a step S3 in FIG. 3.

FIG. 4 is a flow chart showing the details of the edge vicinity region extraction process at the step S3 in FIG. 3. The telop character to be extracted in this embodiment is usually formed with a border at the periphery of the character pattern. That is, since the telop character is superimposed on the background, the border is affixed so that a viewer may easily see the telop character. Of course, a borderless character pattern is also existent in some cases.

In order to correctly extract such a telop character, it is necessary to distinguish the character pattern, the border and the background. When such distinction is to be made using the whole image, the characteristic of the background from which the character pattern is extracted cannot be correctly extracted for the reasons that the background part is overwhelmingly large and various colors and patterns exist in the background. In this embodiment, therefore, an edge vicinity region is extracted with note taken only of the periphery of the character pattern.

In the edge vicinity region extraction process in FIG. 4, at a step S1, the edge region extraction module 20 generates an edge image obtained by extracting an edge from the gray-scale image 34 by a Sobel filter. Subsequently, at a step S2, the edge region extraction module 20 binarizes the edge image, thereby to generate an edge binary image. Subsequently, at a step S3, the edge region extraction module 20 inflates the edge in horizontal and vertical directions in predetermined numbers of pixels, thereby to generate an inflated image being the edge region image 36.

Here, the known Sobel filter is used for the edge extraction at the step S1. This filter is a filter which is generally utilized for edge detection, and which multiplies the upper and lower nine pixels surrounding a certain noted pixel, by predetermined coefficients, respectively, and then totals the resulting products.

FIG. 5 shows practical examples of processed images in the edge vicinity region extraction process in FIG. 4A. FIG. 5 shows a telop region image 68, which contains "Katsuyama Yutaka" as telop characters.

Figure 5A:
FIGS. 5A-5D are explanatory diagrams showing a telop region image, a gray-scale image, an edge binary image and an inflated image in the embodiment.
Figure 5B:
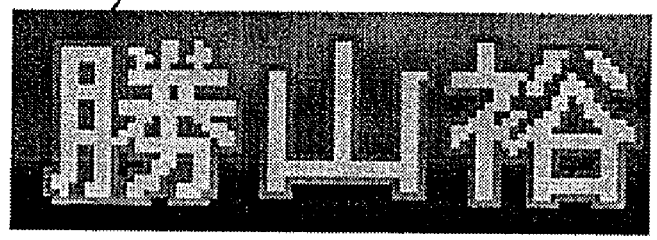
Figure 5C:
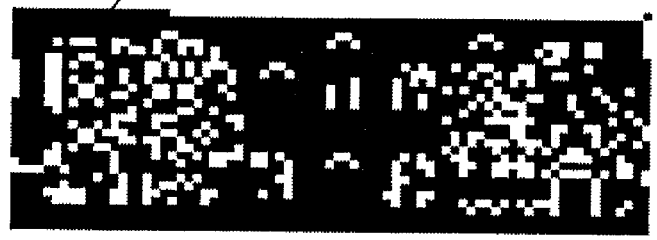

In FIG. 5B shows a gray-scale image 70 generated by applying Formula (1) to the telop region image 68. When the gray-scale image 70 is subjected to the edge extraction by the Sobel filter and is binarized as shown at step S1 in FIG. 4, an edge binary image 72 as shown in FIG. 5C is generated.

Figure 5D:
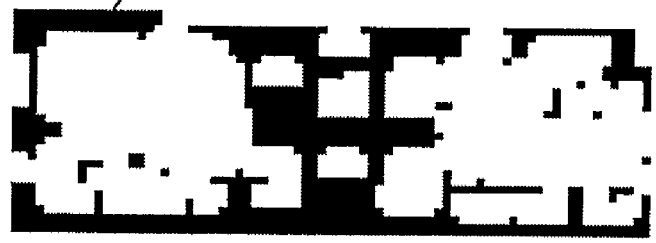

In addition, at a step S3 in FIG. 4, the edge region extraction module 20 inflates an edge image indicated by the white pixels of the edge binary image 72, to generate an inflated image 74 shown in FIG. 5D. An edge vicinity region in the inflated image 74 is a region indicated by white pixels.

Figure 6:
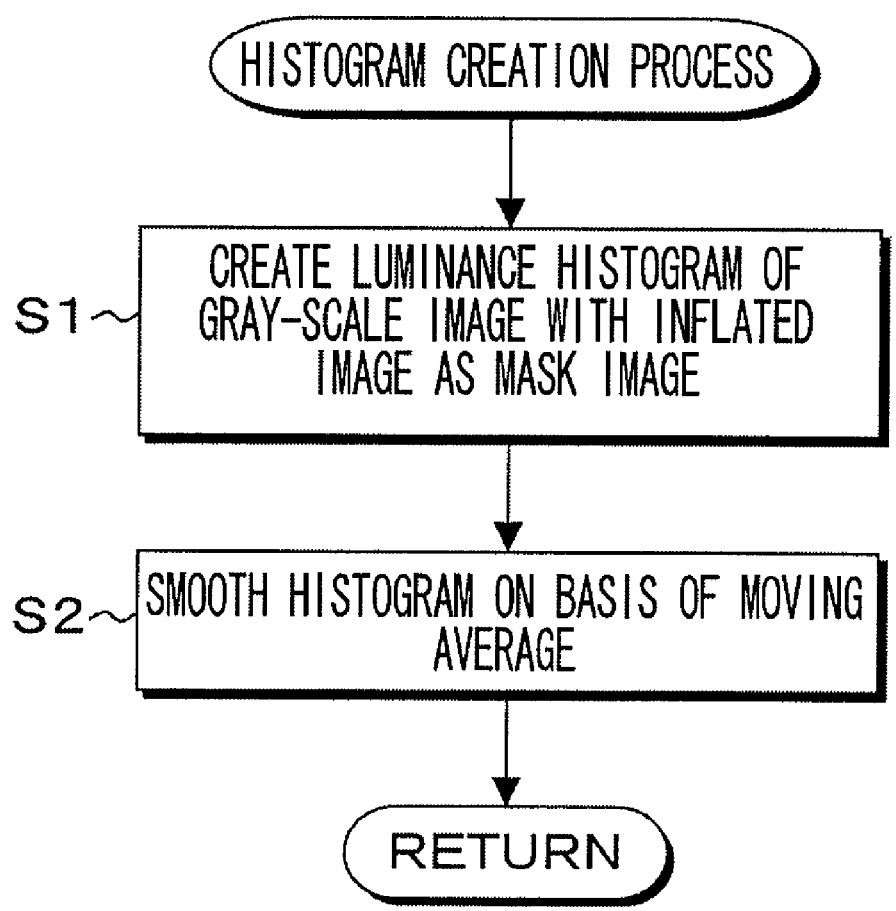
FIG. 6 is a flow chart showing the details of a histogram creation process at a step S4 in FIG. 3.

FIG. 6 is a flow chart showing the details of the histogram creation process at the step S4 in FIG. 3. First, at a step S1, the luminance histogram creation module 22 uses the edge vicinity region (white pixel region) of the inflated image 74 as shown in FIG. 5D, as a mask image, and it counts up the luminances of pixels and the frequencies thereof as to all of those pixels of the gray-scale image 70 as shown in FIG. 5B which are contained in the mask image, thereby to create a luminance histogram.

Figure 7A:
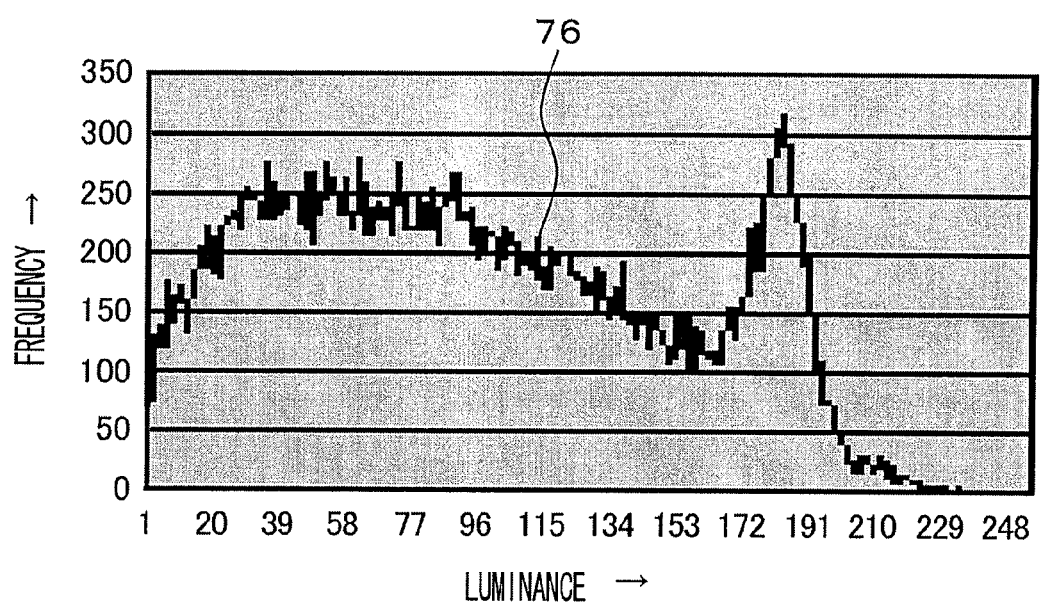
FIGS. 7A-7B are explanatory diagrams showing a smoothing process for a histogram.

FIG. 7A shows the luminance histogram 76 which has been obtained from the luminance values of the pixels of the gray-scale image 70 in FIG. 5B, with the mask image being the inflated image 74 in FIG. 5D.

Figure 8:
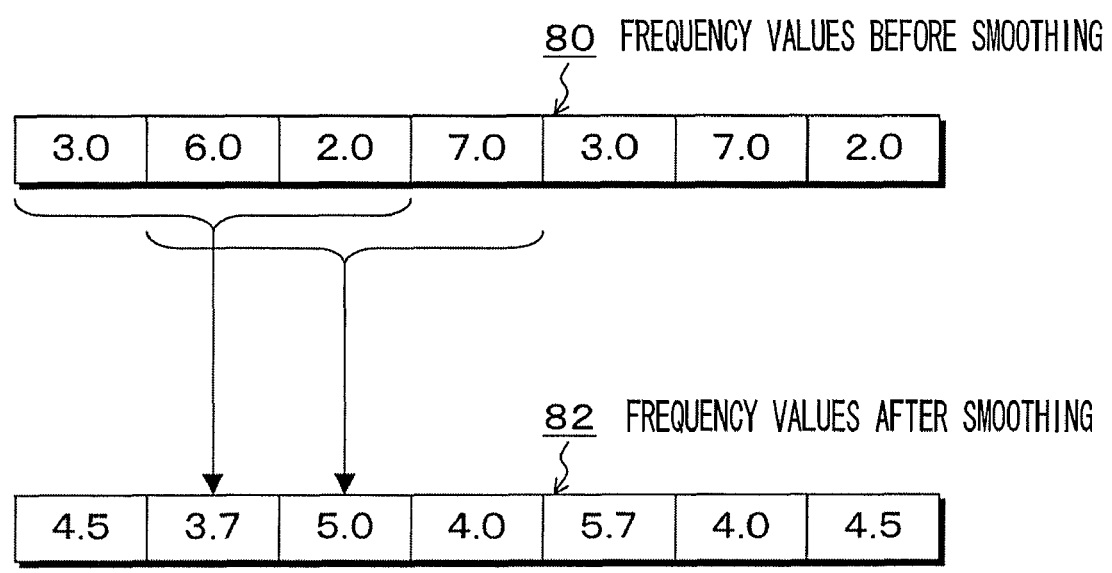
FIG. 8 is an explanatory diagram of a moving average computation for smoothing.

Subsequently, at a step S2 in FIG. 6, the luminance histogram creation module 22 smoothes the histogram 76 on the basis of a moving average. The smoothing is as shown in FIG. 8. More specifically, it is assumed that frequency values before the smoothing, 80 have been obtained for luminance values in a lateral direction. Then, the average value of three frequencies which contain a noted luminance and adjacent luminances on both the sides of the noted luminance is calculated as the moving average while the luminances are being shifted one by one in the lateral direction.

By way of example, regarding luminances "3.0, 6.0 and 2.0" which correspond to three luminance values from a left end, the luminance histogram creation module 22 obtains the average value "3.7" of the three frequencies, and it sets this average value in frequency values after the smoothing, 82 as a frequency value at a middle luminance.

Regarding the frequency "2.0" of the next third luminance value from the left, the luminance histogram creation module 22 obtains a frequency "5.0" by the average of this frequency "2.0" and the frequencies "6.0 and 7.0" of luminance values lying on both the sides thereof, and it stores the frequency "5.0" in the frequency values after the smoothing, 82.

Thenceforth, while the luminance is being similarly shifted rightwards, the moving average of the frequencies of three luminances is obtained. Incidentally, regarding a frequency "3.0" at the head luminance at the left end, only one adjacent luminance exists on a right side. In this case, therefore, a frequency "4.5" is obtained and stored in the frequency values after the smoothing, 82 from the average value of the frequency values "3.0 and 6.0" of the two adjacent luminances.

Figure 7B:
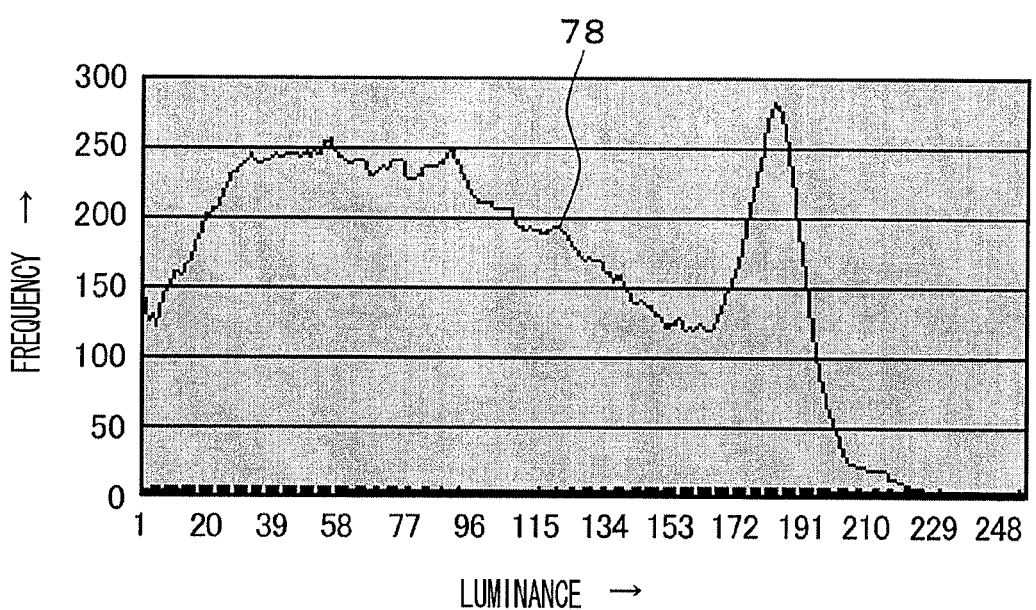

When the smoothing based on the moving average as shown in FIG. 8 is performed, the luminance histogram before the smoothing, 76 as shown in FIG. 7A becomes a luminance histogram after the smoothing, 78 as shown in FIG. 7B, and the luminance histogram having a smooth change can be obtained.

Figure 9:
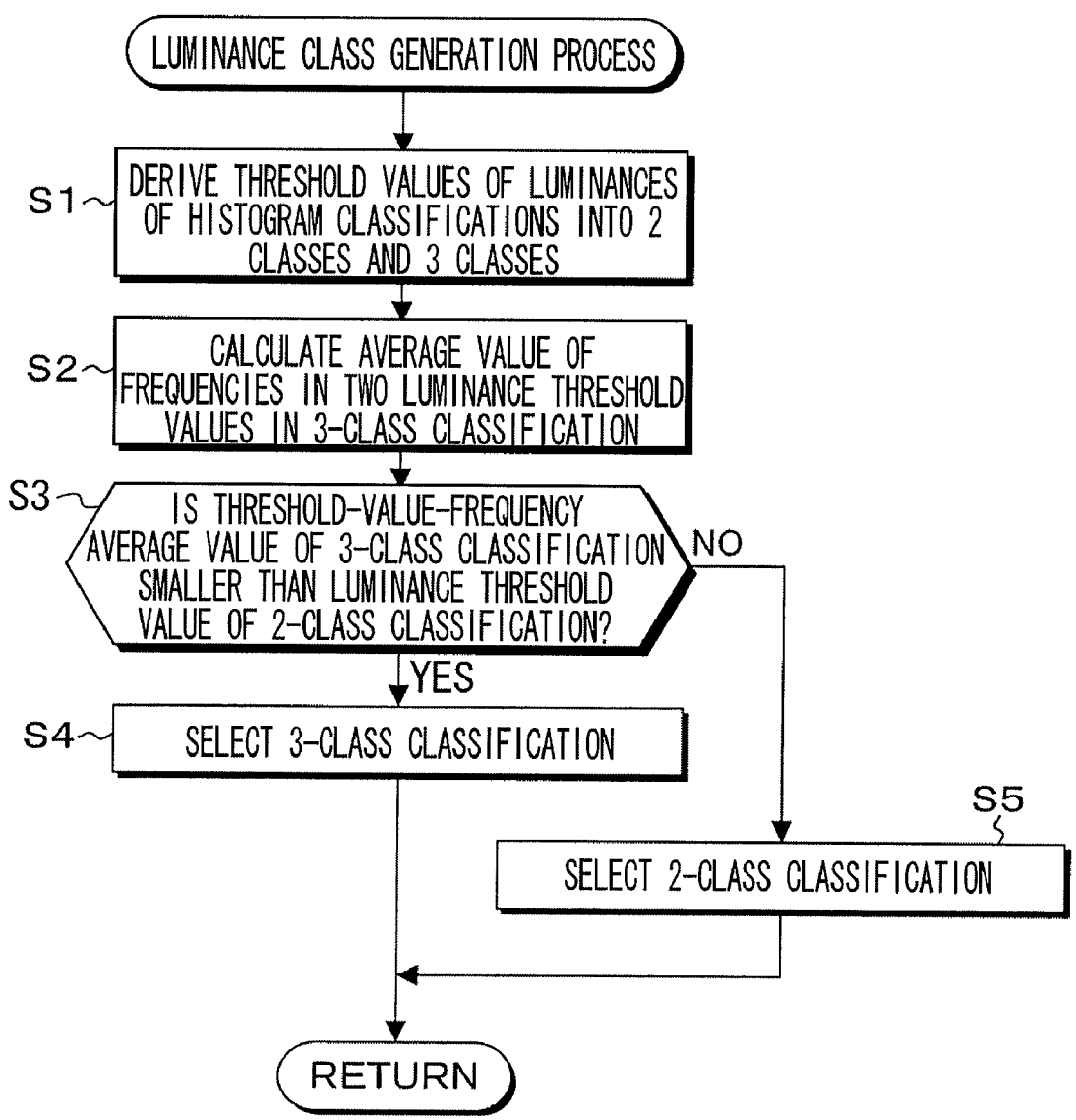
FIG. 9 is a flow chart showing the details of a luminance class generation process at a step S5 in FIG. 3.

FIG. 9 is a flow chart showing the details of the luminance class generation process at the step S5 in FIG. 3. The luminance class generation module 24 performs the multivalued classifications of the luminance histogram 38 so that a telop character can be precisely extracted irrespective of the luminance thereof, in consideration of a case where the luminance of the telop character contained in the telop region image 68 as shown in FIG. 5A has, not only a high luminance, but also a low luminance and a medium luminance.

Referring to FIG. 9, as the multivalued classifications of the histogram in the direction of a luminance axis for the luminance histogram 78 smoothed as shown in FIG. 7B, the luminance class generation module 24 derives the threshold values of luminances for the classifications into 2 classes and 3 classes, in this embodiment.

In the luminance classifications, the 2-class classification is desirable when the telop character is formed with a contour, and the 3-class classification is desirable when the telop character is not formed with any contour. Otsu's method, for example, is used for the derivation of the threshold value or values for the 2-class classification or 3-class classification (refer to NOBUYUKI OTSU: "A Threshold Selection Method from Gray-Level Histograms", IEEE TRANSACTIONS ON SYSTEMS, MAN, AND CYBERNETICS, VOL. SMC-9, NO. 1, JANUARY 1979, pp 62-66).

Figure 10A:
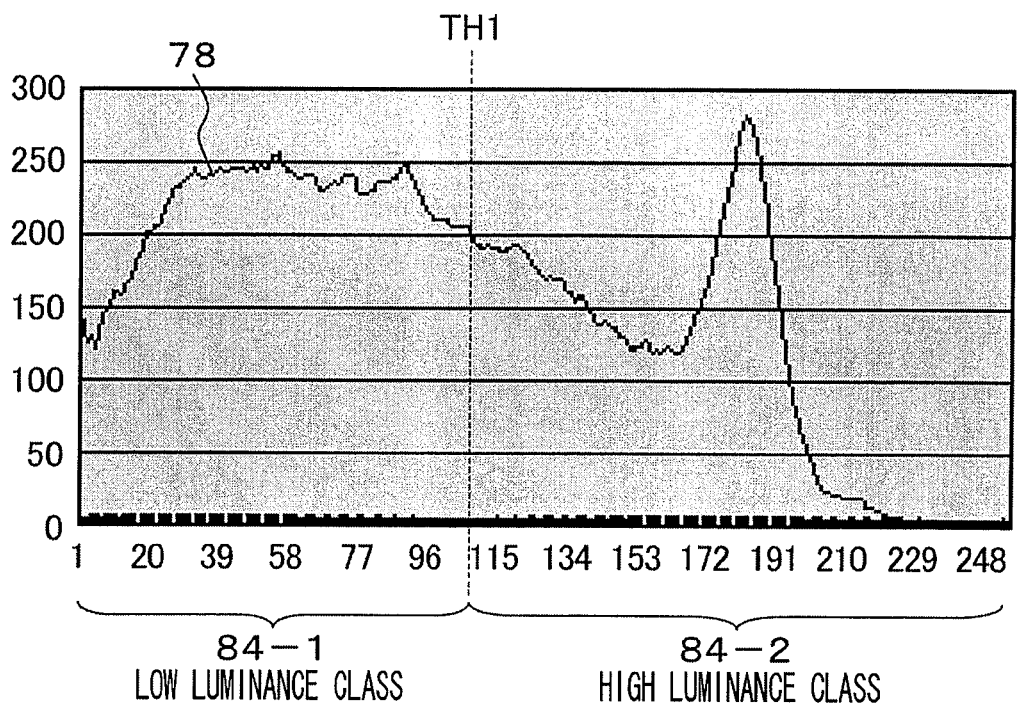
FIGS. 10A-10B are explanatory diagrams of 2-classed and 3-classed luminance histograms in the embodiment.

FIG. 10 is an explanatory diagram of 2-classed and 3-classed luminance histograms in this embodiment. FIG. 10A shows the 2-classed histogram. A threshold value TH1 obtained in accordance with the Otsu method is set, thereby to divide the histogram into a low luminance class 84-1 lower than the threshold value TH1 and a high luminance class 84-2 higher than this threshold value.

Figure 10B:
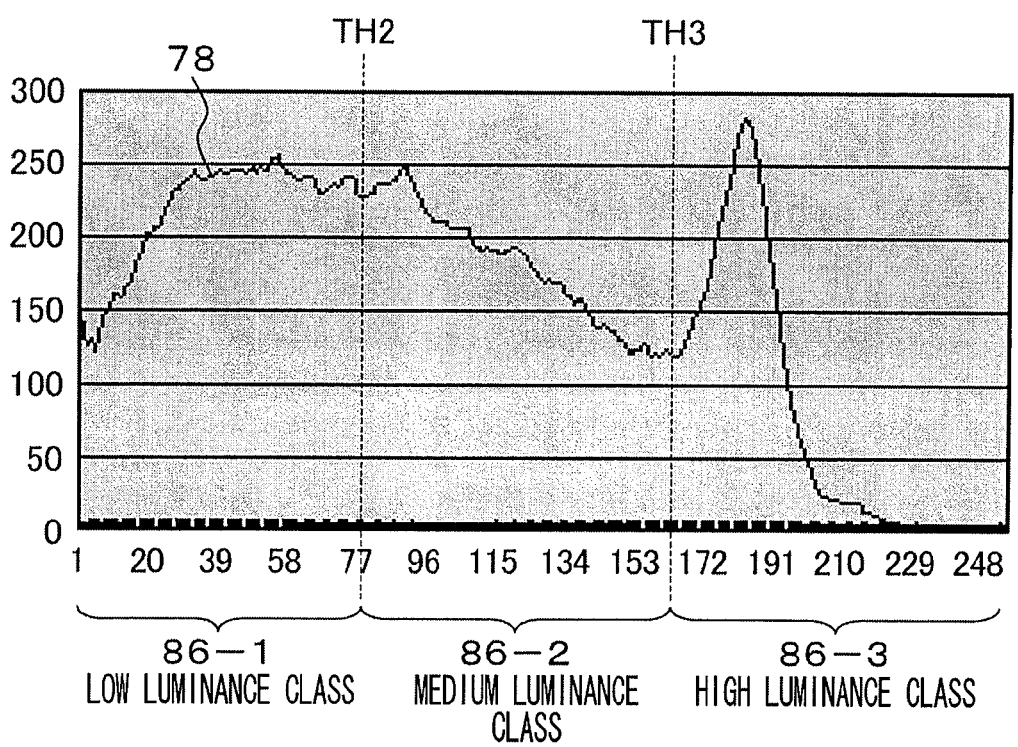

FIG. 10B shows the 3-classed histogram. Two threshold values TH2 and TH3 derived in accordance with the Otsu method are set, thereby to divide the histogram into a low luminance class 86-1, a medium luminance class 86-2 and a high luminance class 86-3.

In the case where the luminance histogram is classified into 2 classes or 3 classes as shown in FIG. 10A or in FIG. 10B, the luminance class generation module 24 calculates the average value (h3L+h3R)/2 of respective frequencies h3L and h3R at the two luminance threshold values TH2 and TH3 of the 3-class classification, at a step S2 in FIG. 9 in order to determine which of the classifications is more suitable.

Subsequently, at a step S3, the luminance class generation module 24 discriminates whether or not the average value of the threshold value frequencies of the 3-class classification as has been obtained at the step S2 is smaller than a frequency h2 on the threshold value TH1 of the 2-class classification in FIG. 10A. When the average value (h3L+h3R)/2 is smaller than the frequency h2, the luminance class generation process proceeds to a step S4, at which the 3-class classification is selected as the more suitable classification. On the other hand, when the frequency h2 on the threshold value TH1 of the 2-class classification is larger, the luminance class generation process proceeds to a step S5, at which the 2-class classification is selected as the more suitable classification.

Figure 11:
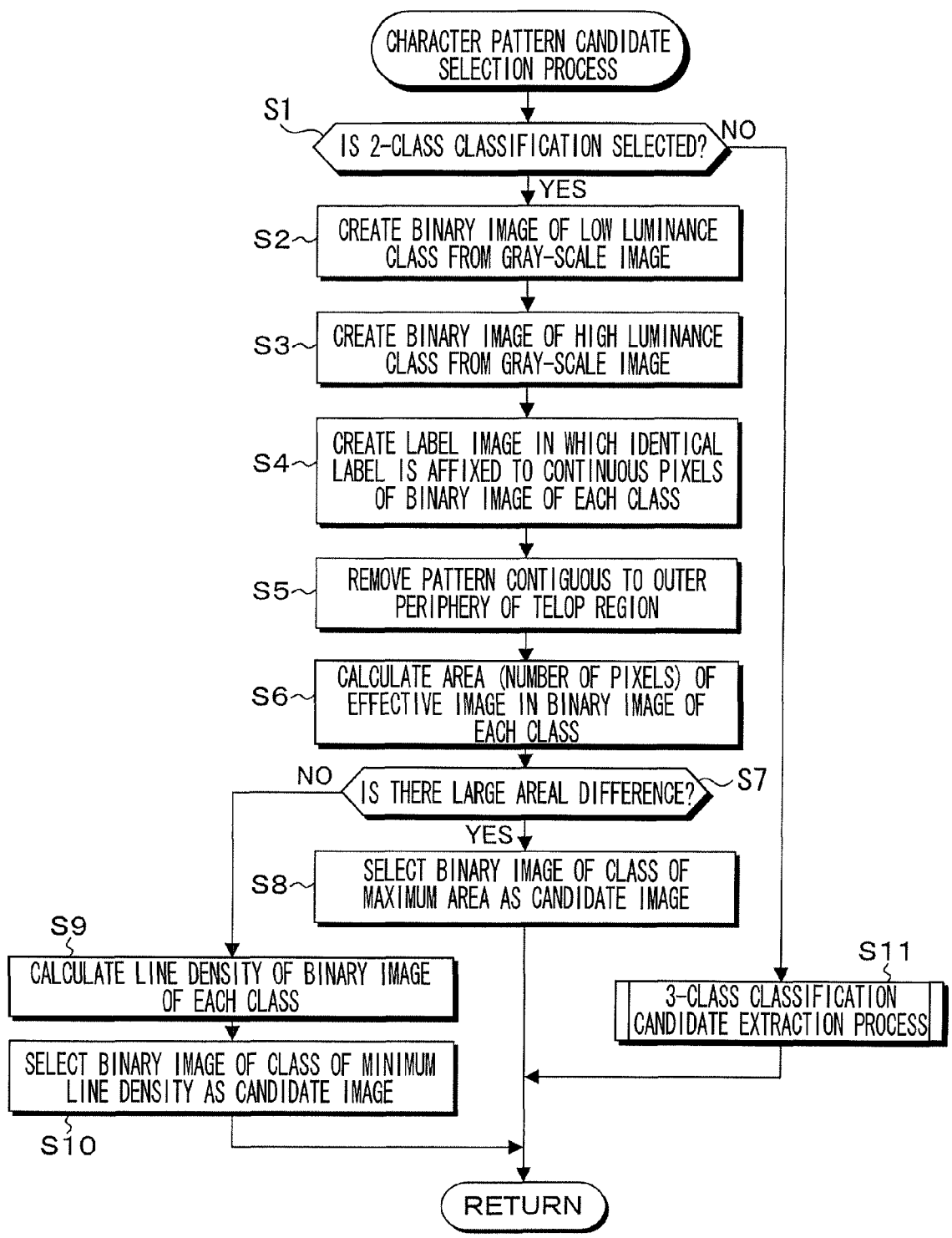
FIG. 11 is a flow chart showing the details of a character pattern candidate selection process at a step S6 in FIG. 3.

FIG. 11 is a flow chart showing the details of the character pattern candidate selection process at the step S6 in FIG. 3. Referring to FIG. 11, the character pattern candidate selection module 26 checks whether or not the 2-class classification has been selected in the luminance class generation process in FIG. 9, at a step S1.

In the case where the 2-class classification has been selected, the character pattern candidate selection process proceeds to the process of a step S2. On the other hand, in the case where the 3-class classification has been selected, the character pattern candidate selection process proceeds to the 3-class classification candidate extraction process of a step S11. The details of the 3-class classification candidate extraction process of the step S11 are shown in the flow chart of FIG. 12.

In a case where the character pattern candidate selection module 26 has selected the 2-class classification at the step S1, it creates at the step S2, a binary image in which only the pixels of luminance values belonging to the low luminance class 84-1 in FIG. 10A are collected, from the gray-scale image 70 corresponding to the telop region image as shown in FIG. 5B.

That is, the character pattern candidate selection module 26 sets a bit "1" for a certain pixel in a case where the pixel is smaller in luminance than the threshold value TH1, and it sets a bit "0" for any other pixel, thereby to create the binary image of the low luminance class.

Subsequently, at a step S3, the character pattern candidate selection module 26 creates that binary image of the high luminance class in which only the pixels of luminance values belonging to the high luminance class 84-2 in FIG. 10A are collected, from the same gray-scale image.

Next, at a step S4, the character pattern candidate selection module 26 creates a label image in which an identical label is affixed to the continuous pixels of the binary image of each class. Owing to the labeling, different label Nos. are affixed to respective character patterns which are formed of continuous pixel groups contained in the telop region.

Subsequently, at a step S5, the character pattern candidate selection module 26 removes the label pixels of any pattern (a pixel group having an identical label No.) contiguous to the outer periphery of the telop region, as noise pixels in relation to the label image. For example, the noise pixels are removed in such a way that the pixel value "1" of the pattern contiguous to the outer periphery is altered to "0".

Subsequently, at a step S6, the character pattern candidate selection module 26 calculates the areas of effective pixels, in other words, the numbers of pixels in the binary images of the low luminance class and the high luminance class. In a case where a large areas difference exists between the areas of the effective images of the binary images of the low luminance class and the high luminance class at a step S7, the character pattern candidate selection module 26 proceeds to a step S8, at which the binary image of the class of the maximum area is selected as a telop character candidate image.

On the other hand, in a case where the large difference does not exist between the areas of the effective images in the binary images of the low luminance class and the high luminance class, the character pattern candidate selection module 26 proceeds to a step S9, at which the line densities of the binary images of the respective classes are calculated. The line density of each binary image is calculated as a value obtained in such a way that the number of switch points from a background pixel "0" into a character pixel "1" is obtained every line of the binary image, and the summation of the switch points is divided by the number of lines of the binary image.

Regarding the line density of the binary image, the character pattern has a shape in which the effective image of the pixel value "1" is brought together to some extent, whereas a noise image assumes a smaller character-pattern line density value because the number of changes in a line direction is smaller than in the character pattern.

Therefore, the character pattern candidate selection module 26 proceeds to a step S10, at which the binary image of the class of the minimum line density is selected as the telop character candidate image.

Figure 12:
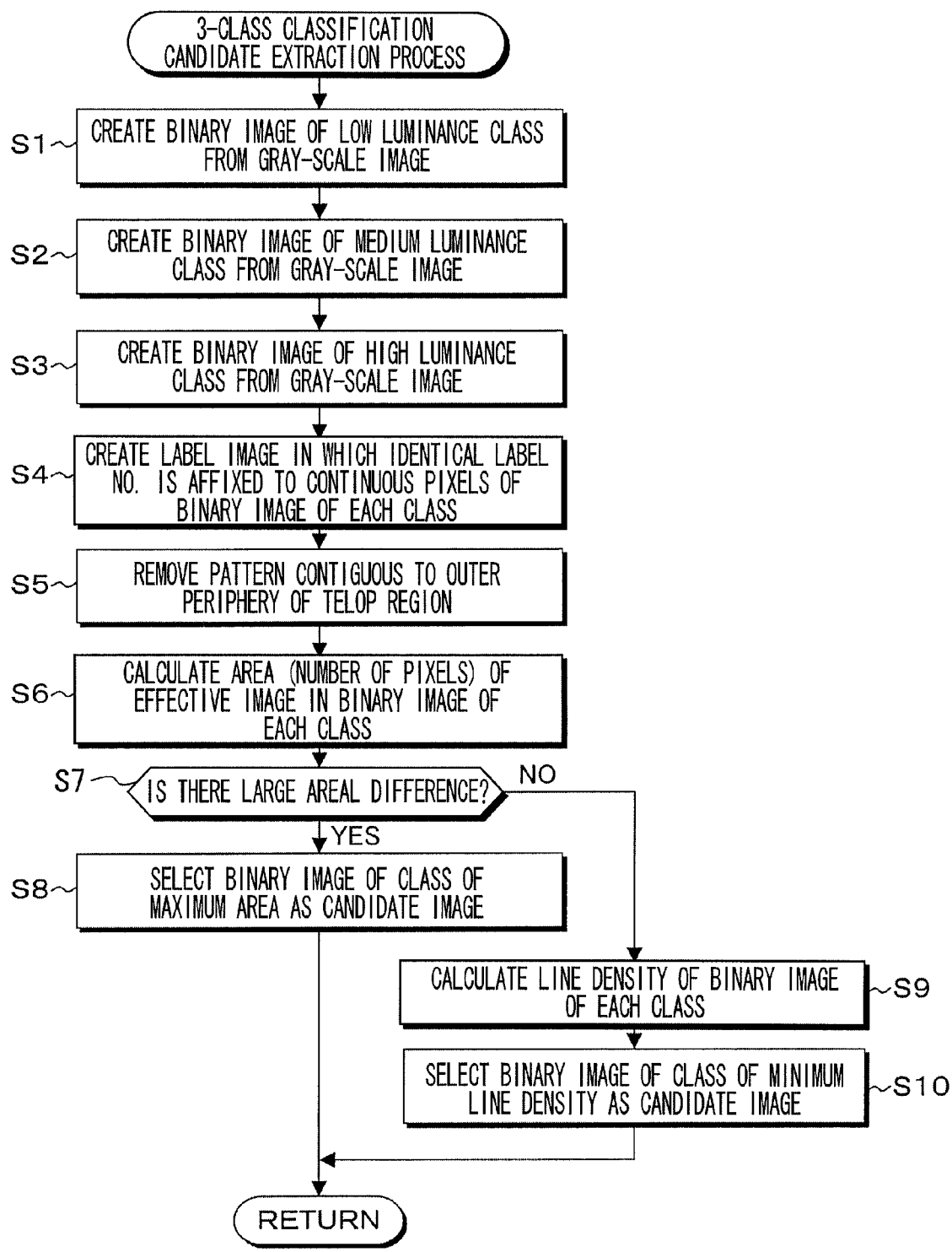
FIG. 12 is a flow chart showing the details of a 3-class classification candidate extraction process at a step S11 in FIG. 11.

The 3-class classification candidate extraction process in FIG. 12 is basically the same as the 2-class classification candidate selection process indicated at the steps S2-S10 in FIG. 11. However, the case of the 3-class classification differs in the point that binary images are generated by dividing the luminances into the 3 classes of the low luminance class, the medium luminance class and the high luminance class.

Figure 13:
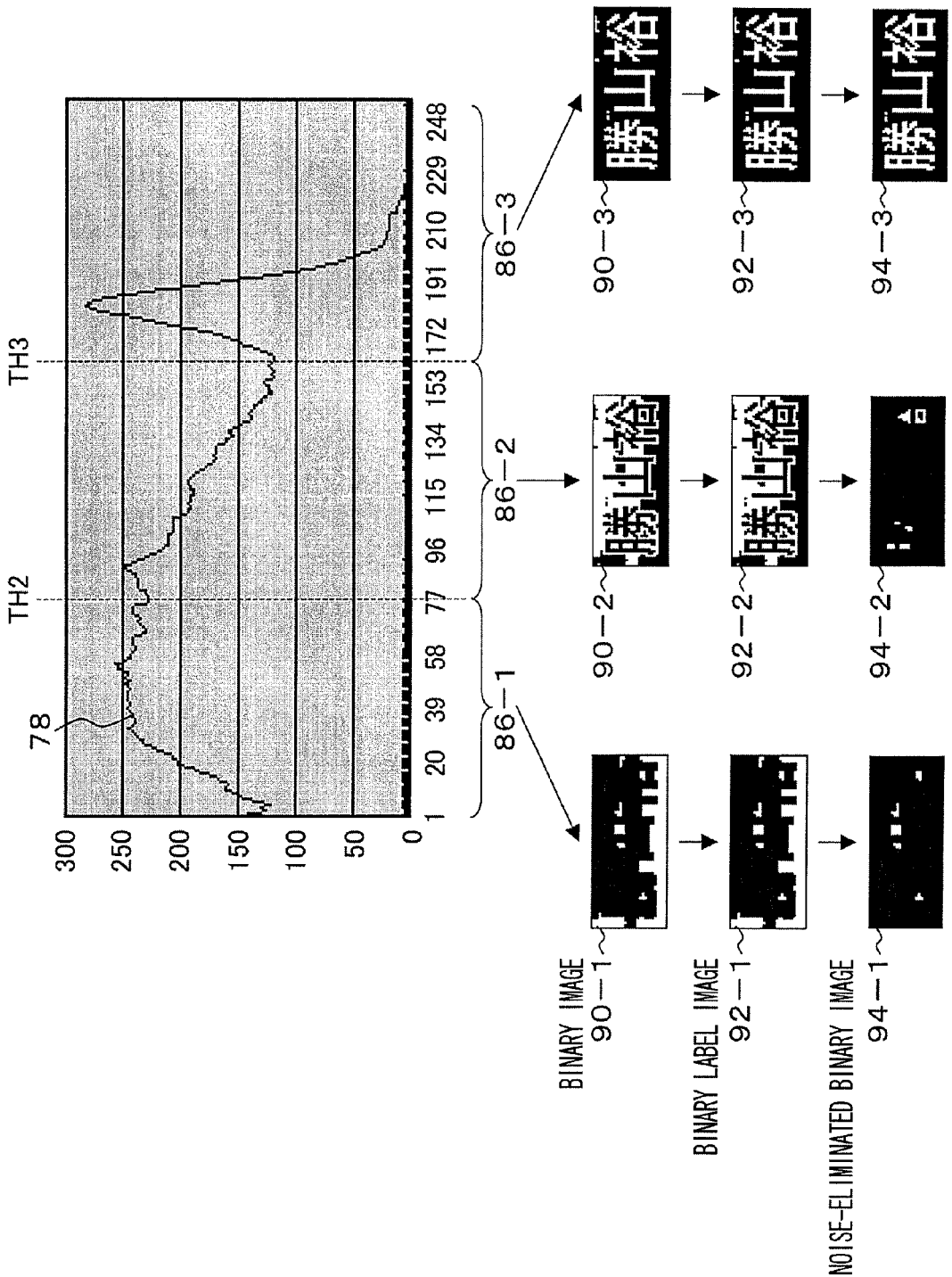
FIG. 13 is an explanatory diagram showing processed images in the 3-class classification candidate extraction process in the embodiment.

The 3-class classification candidate extraction process in FIG. 12 will be described below with reference to an explanatory diagram showing processed images in the 3-class classification candidate extraction process as shown in FIG. 13.

First, at a step S1, the character pattern candidate selection module 26 creates that binary image of the low luminance class in which only pixels of luminance values belonging to the low luminance class 86-1 in a luminance histogram 78 in FIG. 13 are collected, from a gray-scale image corresponding to a telop region image.

Subsequently, at a step S2, the character pattern candidate selection module 26 creates that binary image of the medium luminance class in which only pixels belonging to the medium luminance class 86-2 are collected. Further, at a step S3, the character pattern candidate selection module 26 creates that binary image of the high luminance class in which only pixels of luminance values belonging to the high luminance class 86-3 are collected.

Owing to the processes of the steps S1-S3, there are created the binary image 90-1 of the low luminance class 86-1, the binary image 90-2 of the medium luminance class 86-2 and the binary image 90-3 of the high luminance class 86-3 as shown in FIG. 13.

Subsequently, at a step S4, the character pattern candidate selection module 26 creates label images in which identical labels are affixed to the continuous pixels of the binary images of the respective classes. Thus, the label images 92-1, 92-2 and 92-3 of the respective classes as shown in FIG. 13 are obtained. Incidentally, regarding the binary label images 92-1, 92-2 and 92-3 in FIG. 13, patterns to which the same label Nos. are affixed are represented by the same density lightnesses.

Subsequently, at a step S5, the character pattern candidate selection module 26 removes as noise, those patterns of the label images of the respective classes which are contiguous to the outer peripheries of the telop regions. When the patterns of the label images contiguous to the outer peripheries of the telop regions have been removed, noise-eliminated binary images 94-1, 94-2 and 94-3 in FIG. 13 are obtained.

Figure 14:
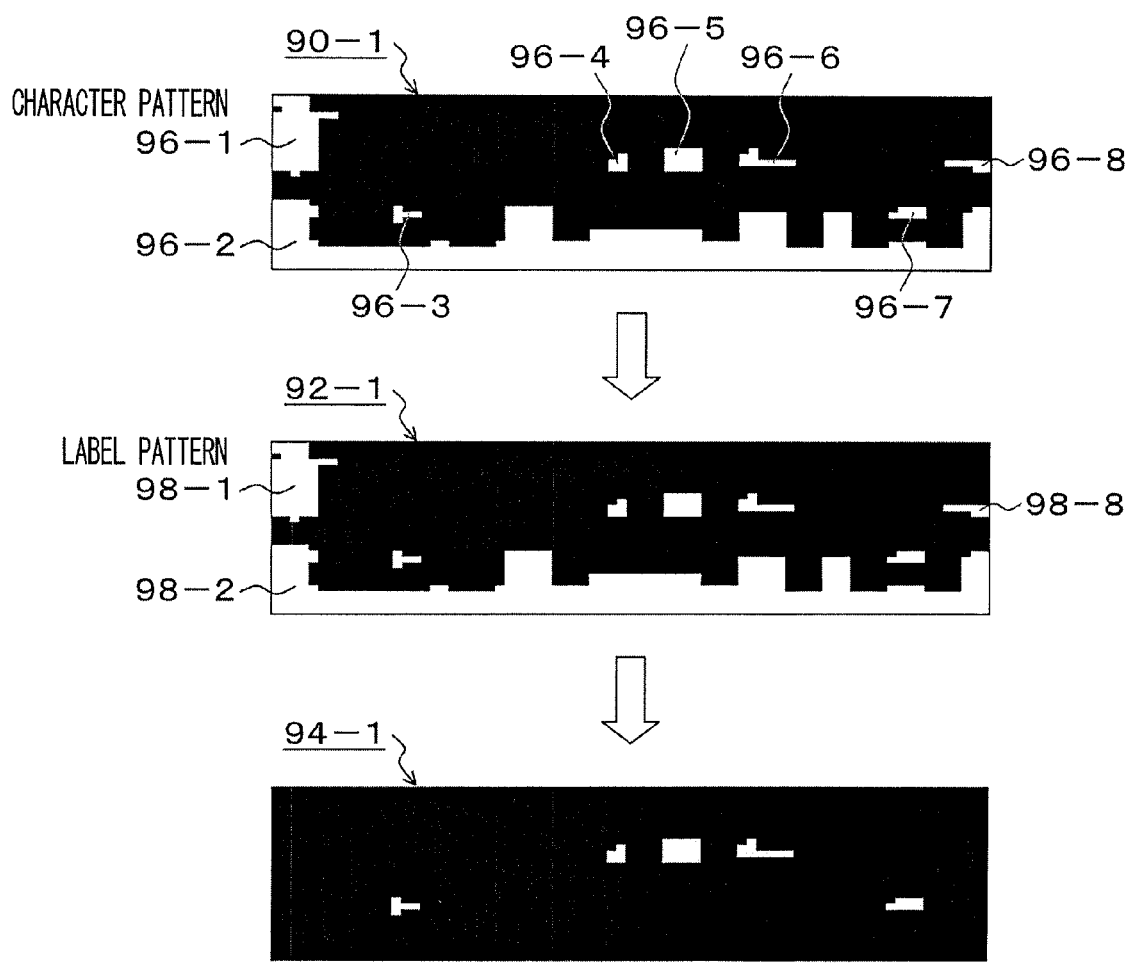
FIG. 14 is an explanatory diagram showing processed images in a low luminance class in FIG. 13, on an enlarged scale.

FIG. 14 shows the processed images in the low luminance class 86-1 in FIG. 13, on enlarged scale. Referring to FIG. 14, in the binary image 90-1 in which the pixels of the luminance values belonging to the low luminance class 86-1 are collected, a plurality of character patterns 96-1 to 96-8 exist at parts indicated by white images.

The character pattern candidate selection module 26 affixes identical labels to continuous pixels as to such a binary image 90-1, thereby to create the binary label image 92-1. In the labeling, different label Nos. are assigned to the respective character patterns 96-1 to 96-8 in the binary image 90-1, and the identical assigned label No. is affixed to all the pixels belonging to the identical pattern.

Regarding the binary label image 90-1 thus generated, the character pattern candidate selection module 26 removes label patterns 98-1, 98-2 and 98-8 contiguous to the outer periphery of the telop region, as noise, thereby to generate the noise-eliminated binary image 94-1.

Referring to FIG. 12 again, when the patterns of the label images contiguous to the outer peripheries of the telop regions have been removed at the step S5, the character pattern candidate selection module 26 calculates the areas (the numbers of pixels) of the effective images in the binary images of the respective classes, at a step S6.

In the case of FIG. 13, the effective image area of the noise-eliminated binary image 94-3 of the high luminance class 86-3 is sufficiently large relative to the areas of the character patterns of the respective noise-eliminated binary images 94-1 and 94-2 of the low luminance class and the medium luminance class.

In a case where a large areal difference exists among the binary images of the respective classes in this manner, the character pattern candidate selection module 26 proceeds from a step S7 to a step S8, at which the binary image of the class of the maximum area is selected as a telop character candidate image. That is, in the case of FIG. 13, the noise-eliminated binary image 94-3 of the high luminance class 86-3 is selected as the telop character candidate image.

On the other hand, in a case where the large areal difference does not exist in the areas of the effective images in the binary images of the respective classes, at the step S7, the character pattern candidate selection module 26 calculates the line densities of the binary images of the respective classes at a step S9, and it selects the binary image of the class of the minimum line density as a telop character candidate image, at a step S10.

Figure 15:
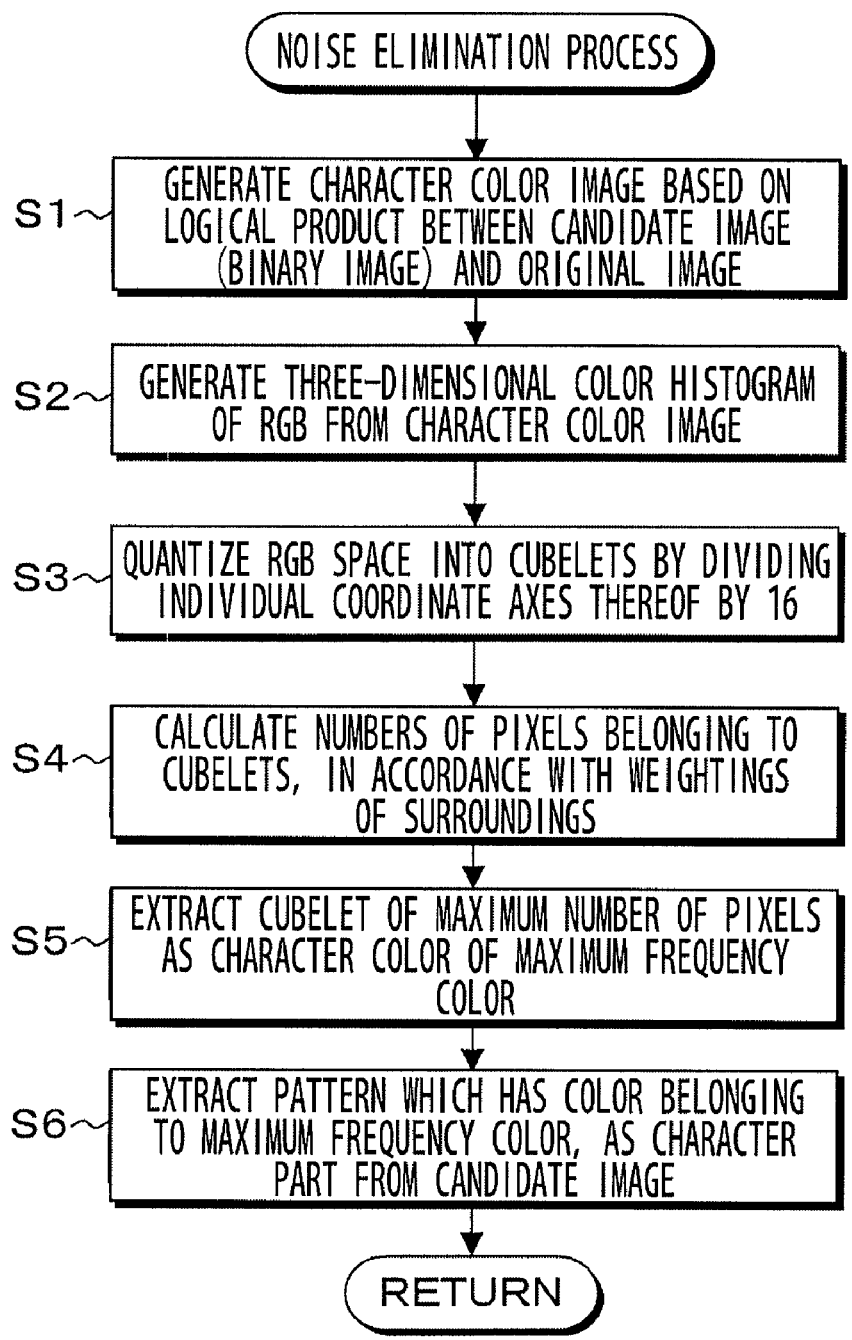
FIG. 15 is a flow chart showing the details of a noise elimination process at a step S7 in FIG. 3.

FIG. 15 is a flow chart showing the details of the noise elimination process at the step S7 in FIG. 3. Here, this embodiment is characterized in that noise is eliminated on the basis of the extraction of the maximum frequency color.

Figure 16:
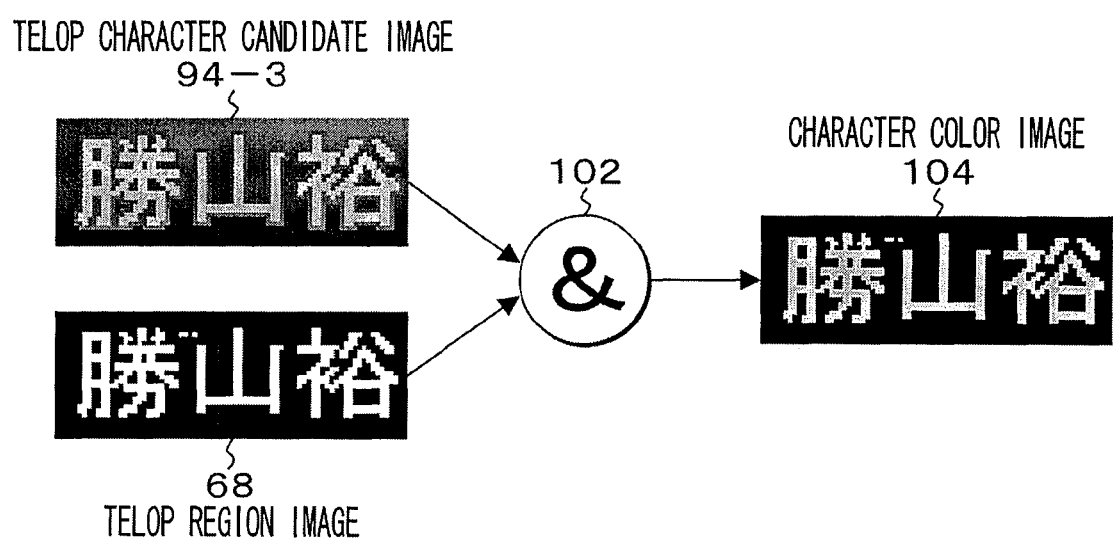
FIG. 16 is an explanatory diagram showing the processed images of character color image generation at a step S1 in FIG. 15.

Referring to FIG. 15, at a step S1, the noise elimination module 28 generates a character color image on the basis of the logical product between the telop character candidate image (binary image) and the telop region image 68 which is shown in FIG. 5A and which is the original image. As shown in FIG. 16 by way of example, the logical product 102 between the telop character candidate image 94-3 and the telop region image 68 being the original image is evaluated, thereby to generate a character color image 104.

At a step S2, the noise elimination module 28 generates a three-dimensional color histogram of RGB from the character color image. At a step S3, the noise elimination module 28 divides the individual coordinate axes of an RGB space by n (for example, n=16), thereby to quantize the RGB space into cubelets. That is, the RGB space is a cube each axis of which is of 256 levels of 0 to 255, and quantized (16×16×16) cubelets are created by dividing each axis by 16.

At a step S4, the noise elimination module 28 calculates the numbers of pixels (counts) of colors belonging to the cubelets, in accordance with the weightings of the surroundings. More specifically, in a case where a certain cubelet is noted, the numbers of pixels of 26 cubelets existing around the noted cubelet are compared, and a value which is obtained by totalizing all the numbers of pixels of the surrounding cubelets, as to only the cubelets whose numbers of pixels are larger than or equal to those of the cubelets in the surroundings, is set as the number of pixels of the noted cubelet.

At a step S5, the noise elimination module 28 extracts the cubelet of the maximum number of pixels as the character color of the maximum frequency color. At a step S6, the noise elimination module 28 extracts a pattern having the character color contained in the cubelet of the maximum frequency color, as a character part from within the candidate image of the telop character, and it eliminates as noise, any pattern which has a color not belonging to the maximum frequency color.

Figure 17:
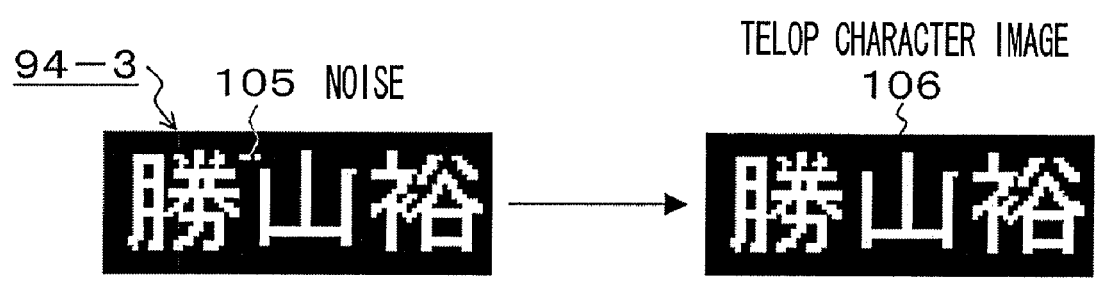
FIG. 17 is an explanatory diagram showing processed images based on noise elimination in FIG. 15.

By way of example, in FIG. 17, the character color which belongs to the maximum frequency color of the cubelet of the maximum number of pixels as has been obtained from the character color image 104 in FIG. 16 is extracted as to the telop character candidate pattern 94-3, whereby a pattern 105 which has a color not belonging to the maximum frequency color is eliminated as noise, and a telop character image 106 can be extracted.

The telop character image 106 thus generated is outputted to the character recognition unit 46 as shown in FIG. 1 as may be needed, and character codes are recognized from the telop character image 106 being the binary image, by the OCR process, whereby textization for retrieval can be performed.

Figure 18:
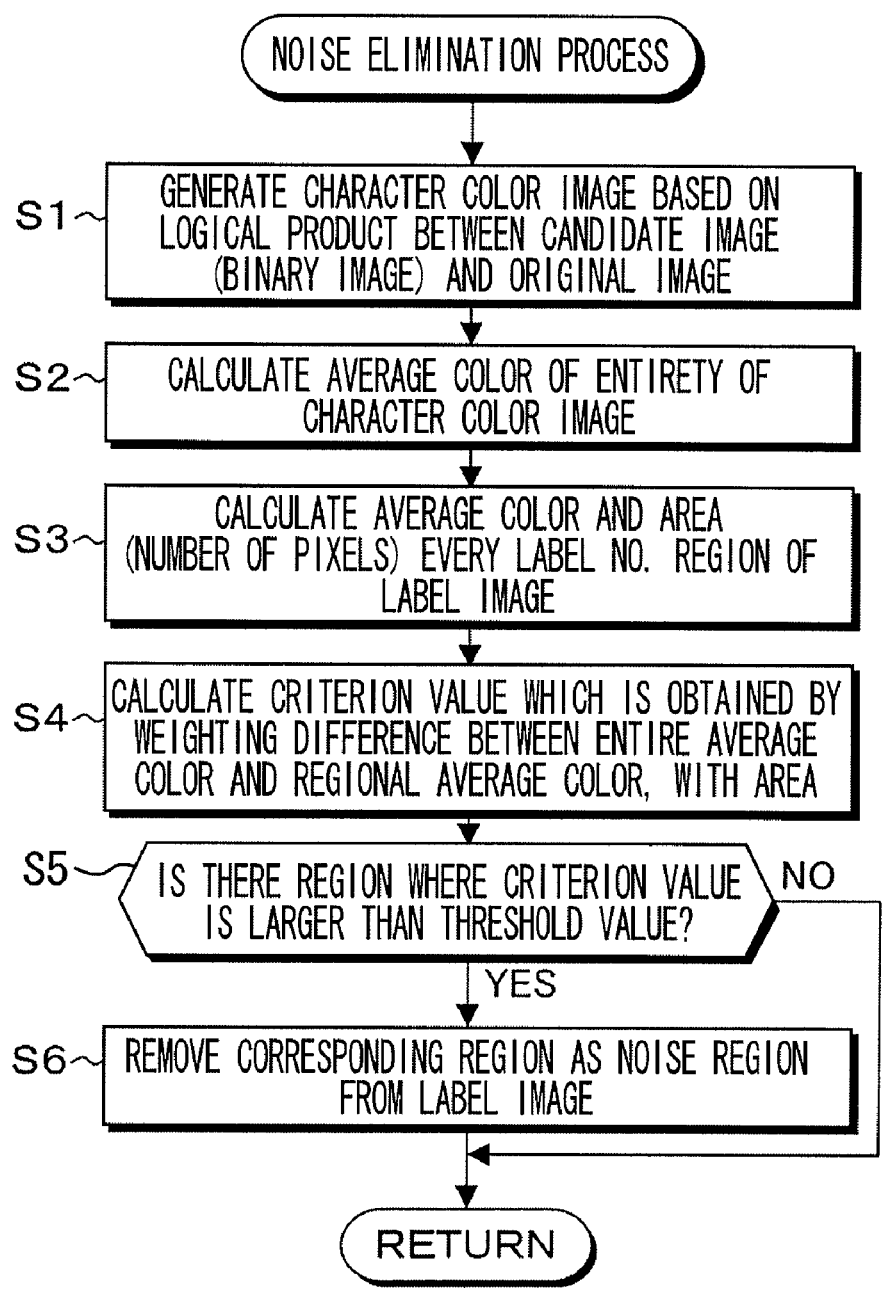
FIG. 18 is a flow chart showing another embodiment of the details of the noise elimination process at the step S7 in FIG. 3.

FIG. 18 is a flow chart showing another embodiment of the noise elimination process at the step S7 in FIG. 3. The noise elimination process of this embodiment is characterized in that an average color is extracted so as to eliminate any noise pattern.

In the noise elimination process in FIG. 18, at a step S1, the noise elimination module 28 generates the character color image 104 which is based on the logical product 102 between the telop character candidate image 94-3 and the telop region image 68 being the original image, as shown in FIG. 16.

At a step S2, the noise elimination module 28 calculates the average color of the entirety of the character color image 104. The average color of the entire character image calculated in this way is denoted as (r_mean, g_mean, b_mean).

At a step S3, the noise elimination module 28 calculates the average color and an area (the number of pixels) for every label No. region of the binary label image in the character color image 104. The binary label image 92-3 generated for the high luminance class 86-3 in FIG. 13 is utilized as the label image on this occasion.

The noise elimination module 28 obtains the average color of every region of each label No. in the binary label image as is calculated at the step S3, as an average color (r1, g1, b1) in case of, for example, label No.=1, and it obtains the area of the region of the label No.=1, as (count).

At a step S4, the noise elimination module 28 calculates a criterion value which is obtained in such a way that the difference between the entire average color and the regional average color is weighted with the area. Here, the criterion value denoted as "value" is calculated by the following formula:

$$\text{value} = |r\_mean - r1| * count + |g\_mean - g1| * count + |b\_mean - b1| * count$$

The criterion value "value" calculated at the step S4 assumes a larger value as the area of the label region becomes larger and as the difference of the color from the average color of the entirety becomes larger.

Accordingly, the noise elimination module 28 discriminates whether or not there is any region where the criterion value "value" is larger than a predetermined threshold value, at the next step S5. In the region where the criterion value is larger than the threshold value, the noise elimination process proceeds to a step S6, at which the corresponding region of the telop character candidate image is removed as a noise region.

The above embodiments have exemplified the processing of the Japanese language as the telop characters. However, regarding characters in any language different from Japanese, for example, English telop characters, not only the telop characters of high luminance, but also those of low luminance or medium luminance can be precisely extracted by applying the telop character extraction process according to the invention quite similarly.

FIG. 19 shows processed images generated by the edge vicinity region extraction process in FIG. 4, according to an embodiment directed toward English telop characters. In FIG. 19A shows a telop region image 108 which contains the English telop characters "Yutaka", and a gray-scale image 110 in FIG. 19B is obtained in conformity with Formula (1), as to the telop region image 108.

Figure 19A:
FIGS. 19A-19D are explanatory diagrams showing a telop region image, a gray-scale image, an edge binary image and an inflated image in an embodiment which is directed toward English telop characters.
Figure 19B:
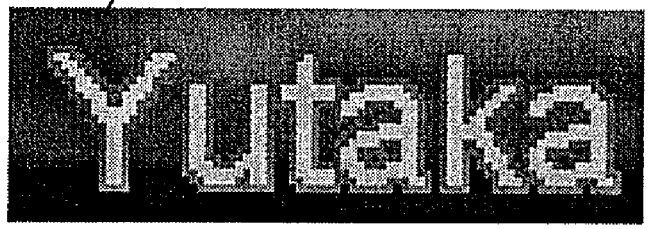
Figure 19C:
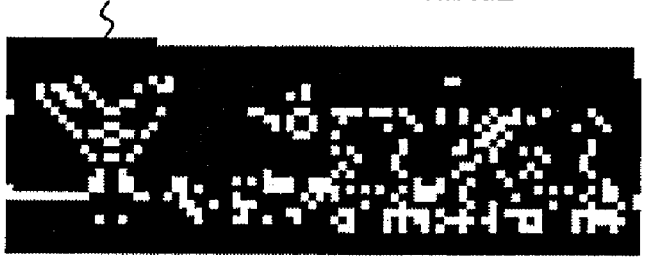
Figure 19D:
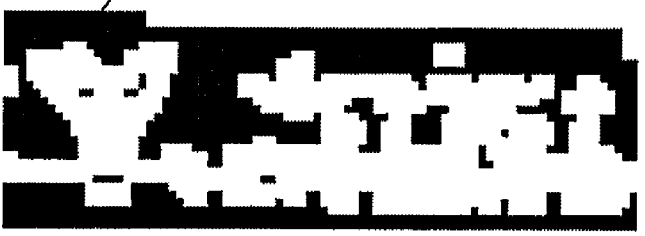

As to the gray-scale image 110 obtained in this way, edges are extracted by the Sobel filter at the step S1 in FIG. 4, thereby to generate an edge binary image 112 shown in FIG. 19C. Subsequently, as to the edge binary image 112, the edges are inflated at the step S3 in FIG. 4, thereby to generate an inflated image 114 in FIG. 19D. In the inflated image 114, an edge vicinity region becomes a region indicated by white pixels.

Figure 20:
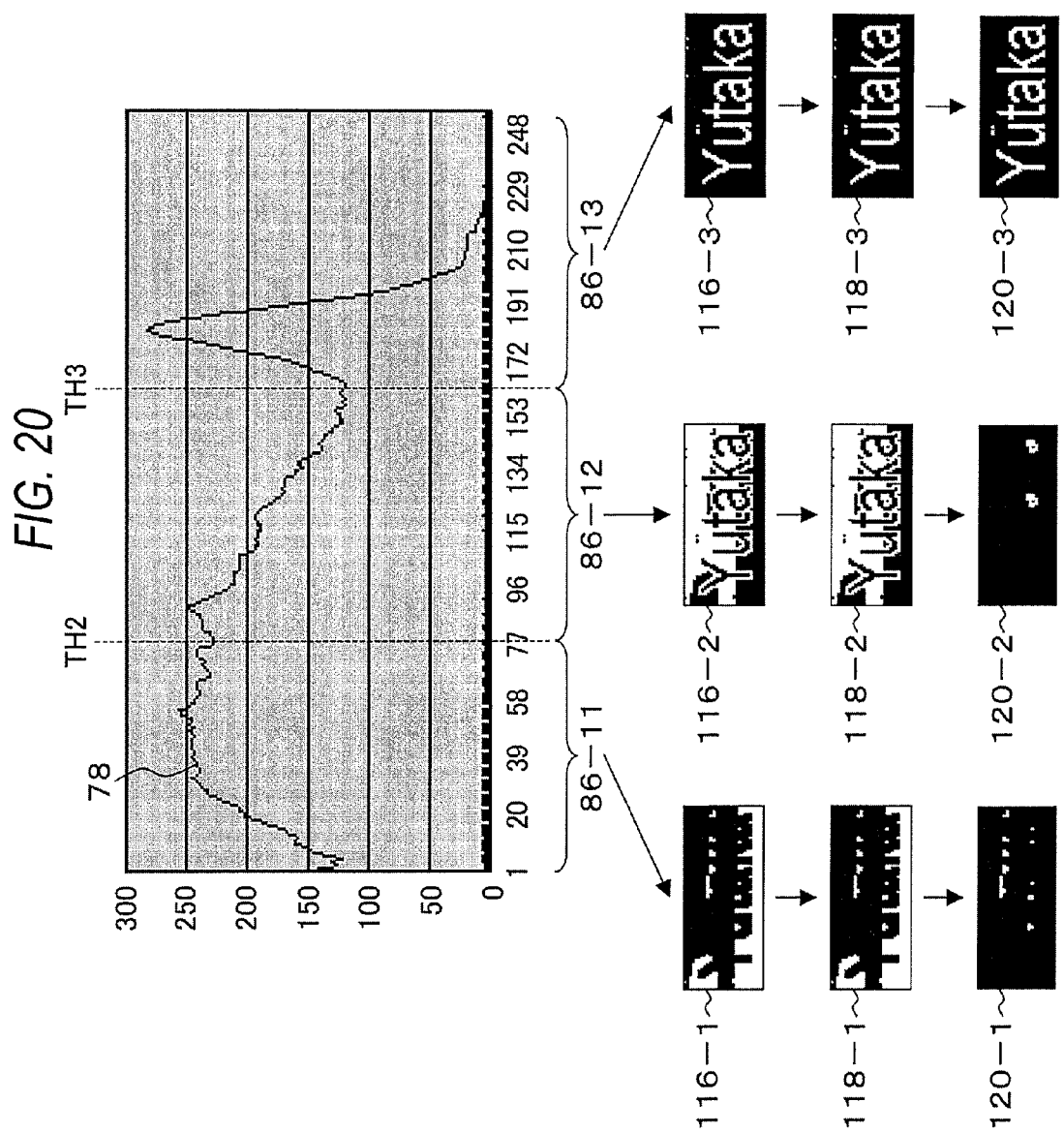
FIG. 20 is an explanatory diagram showing processed images in a 3-class classification candidate extraction process in the embodiment which is directed toward the English telop characters.

FIG. 20 shows processed images in the 3-class classification candidate extraction process in FIG. 12 as directed toward English telop characters. Even in case of processing the English telop characters, in a luminance histogram 78 subjected to the 3-class classification by way of example, binary images 116-1, 116-2 and 116-3 in individual classes are respectively generated as to the low luminance class 86-11, medium luminance class 86-12 and high luminance class 86-13. Thereafter, labeling in which identical label Nos. are affixed to continuous pixels is performed, thereby to generate binary label images 118-1, 118-2 and 118-3. Subsequently, the label pixels of patterns contiguous to the outer peripheries of telop regions are removed as noise elements, thereby to generate noise-eliminated binary images 120-1, 120-2 and 120-3.

In addition, the areas (the numbers of pixels) of effective pixels in the noise-eliminated binary images 120-1 to 120-3 of the respective classes are calculated. Since large areal differences exist in this case, the noise-eliminated binary image 120-3 of the high luminance class 86-13 as having the maximum area is selected as a telop character candidate image.

Figure 21:
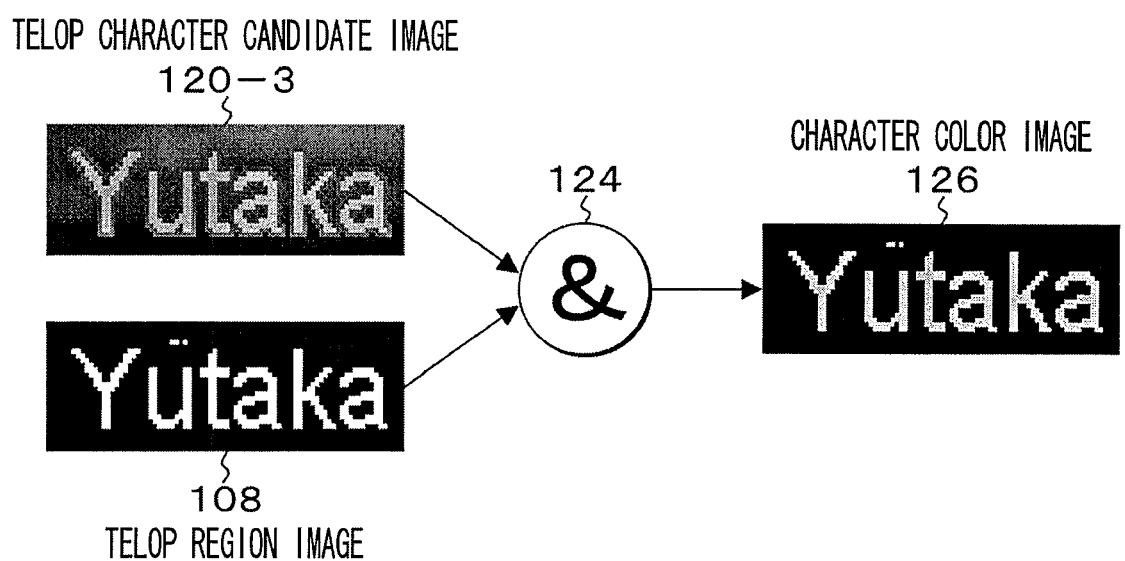
FIG. 21 is an explanatory diagram showing the processed images of the character color image generation at the step S1 in FIG. 15, as directed toward the English telop characters.

The telop character candidate image 120-3 directed toward the English telop characters and selected in this way, is subjected to the noise elimination based on, for example, the maximum frequency color shown in FIG. 15. Thereafter, as shown in FIG. 21, a character color image 126 is generated by taking the logical product 124 between the telop character candidate image 120-3 and a telop region image 108 being the original image.

In addition, an RGB three-dimensional color histogram is generated from the character color image 126. Further, an RGB space is quantized into cubelets by dividing each coordinate axis thereof by 16. Thereafter, the numbers of pixels belonging to the cubelets are calculated in accordance with the weightings of surroundings, and a color belonging to the cubelet of the maximum number of pixels is extracted as the character color of the maximum frequency color.

Figure 22:
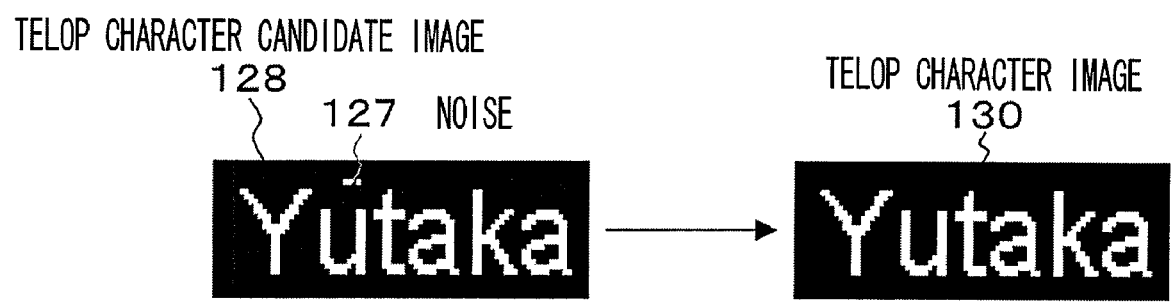
FIG. 22 is an explanatory diagram showing processed images according to the noise elimination in FIG. 15 as directed toward the English telop characters.

Finally, as shown in FIG. 22, a pattern which has the color belonging to the cubelet of the maximum frequency color is extracted as a character part from within a telop character candidate image 128, and a pattern in a color not belonging to the maximum frequency color is eliminated as noise 127, whereby an English telop character image (binary image) 130 of high precision free from the noise can be extracted.

In addition, the invention provides a record medium in which a telop character extraction program to be run by a computer is stored. Here, the "record medium" covers, not only a portable storage medium such as CD-ROM, floppy disk (R), DVD disk, magnetooptic disk or IC card, but also a storage device such as hard disk drive disposed inside or outside a computer system. In addition, it covers a database or another computer system as well as the database thereof, which retains the program through a line. Further, it covers a transmission medium on a line.

Incidentally, the foregoing embodiments have exemplified the case of extracting the telop character which is contained in a frame image being a static image, in a television video image or the like. However, the invention is not restricted to the exemplary case, but it is directly applicable to the extraction of a character existing on the background of any proper static image.

Besides, as the derivation of a threshold value for the luminance class generation in the foregoing embodiments, the threshold value has been derived by the Ohtsu method which can maximize the classification, but classification based on a threshold value which is fixedly set beforehand may well be performed. Further, the 2-class classification and the 3-class classification have been exemplified as the multivalued classification in the foregoing embodiments, but it is a matter of course that classification into more classes may well be performed.

Moreover, the invention shall cover appropriate modifications which do not spoil the object and advantages of the invention. Further, the invention is not restricted by any numerical value indicated in the foregoing embodiments.

According to the invention, the peak distribution of luminances where a telop character exists can be obtained relatively.

Therefore, not only a telop character of high luminance lying scattered in a telop region, but also a telop character of low luminance or medium luminance can be extracted at high precision, and the recognition rate of the telop characters for textization can be heightened.

What is claimed is:

1. A non-transitory computer-readable record medium in which a telop character extraction program to be executed by a computer is stored, the telop character extraction program comprising:
   an image input unit which receives a telop region image that contains telop characters cut out from color image data;
   a gray-scale image generation unit which generates a gray-scale image from the telop region image;
   an edge region extraction unit which generates an edge region image where an edge is extracted from within the gray-scale image and is inflated;
   a histogram creation unit which uses the edge region image as a mask image, and which creates a luminance histogram of pixels of the gray-scale image as belong to the mask image;
   a luminance class generation unit which divides a luminance of the luminance histogram into a plurality of luminance classes;
   a character pattern candidate selection unit which generates binary images where pixels of luminances belonging to the individual classes are collected for the respective luminance classes, and which selects the binary image of the class of maximum area, as a telop character candidate image; and
   a noise elimination unit which decides on a character color used in the telop region image, in correspondence with the telop character candidate image, and which extracts character pixels corresponding to the character color, from within the telop character candidate image, thereby to eliminate noise pixels and to generate a telop character image.

2. A computer-readable record medium as defined in claim 1, wherein:
   said edge region extraction unit generates an edge image in which the edge has been extracted from within the gray-scale image; and
   said edge region extraction unit binarizes the edge image, thereby to generate an edge binary image; and
   said edge region extraction unit inflates edge pixels of the edge binary image, thereby to generate the edge region image.

3. A computer-readable record medium as defined in claim 1, wherein after having created the luminance histogram, said luminance histogram creation unit calculates a moving average value with a plurality of adjacent luminance histogram values, as each luminance histogram value, thereby to smooth the luminance histogram.

4. A computer-readable record medium as defined in claim 1, wherein:
   said luminance class generation unit generates a plurality of sorts of luminance histograms which have luminance classes divided by setting one or more threshold values on a luminance axis of the first-mentioned luminance histogram; and
   said luminance class generation unit compares average values of histogram values on the threshold values, as to the plurality of sorts of luminance histograms, so as to select the luminance histogram of minimum average value.

5. A computer-readable record medium as defined in claim 1, wherein:
   said luminance class generation unit generates a first luminance histogram which has luminance classes bisected by setting one threshold value on a luminance axis of the luminance histogram, and a second luminance histogram which has luminance classes trisected by setting two threshold values on the luminance axis of the luminance histogram; and
   said luminance class generation unit compares a histogram value on the threshold value, in the first luminance histogram of the bisected luminance classes, and an average value of histogram values on the two threshold values, in the second luminance histogram of the trisected luminance classes, so as to select the luminance histogram of smaller value.

6. A computer-readable record medium as defined in claim 1, wherein:
   said character pattern candidate selection unit generates binary images in which pixels of luminances belonging to the individual classes are collected for the respective luminance classes;
   said character pattern candidate selection unit generates binary label images in each of which character patterns are formed by affixing identical label Nos. to continuous pixels;
   said character pattern candidate selection unit detects the label No. of the character pattern which is contiguous to an outer periphery of the telop region image, from the character patterns contained in each of the binary label images;
   said character pattern candidate selection unit eliminates character pixels having the detected label No., as background noise; and said character pattern candidate selection unit obtains areas of binary images from each of which the background noise has been removed, for the respective classes, so as to select the binary image of the class of maximum area as a telop character candidate image.

7. A computer-readable record medium as defined in claim 6, wherein said character pattern candidate selection unit calculates line densities of the respective binary level images of the individual classes in a case where the areas of the binary images obtained for the respective classes do not have a large difference, so as to select the binary image of the class of minimum line density as the telop character candidate image.

8. A computer-readable record medium as defined in claim 7, wherein each of the line densities is a value which is obtained in such a way that a summation obtained by adding numbers of change points from background pixels to character pixels, for respective lines of the corresponding binary image, is divided by the number of the lines of the corresponding binary image.

9. A computer-readable record medium as defined in claim 1, wherein:
said noise elimination unit generates a character color image by taking a logical product between the telop character image and the telop character region image being an original image, so as to extract a maximum frequency color, and extracts character pixels corresponding to the maximum frequency color and eliminates noise pixels from within the telop character candidate image, thereby to generate a telop character image;
wherein said extraction of the maximum frequency color is executed in such a way:
that a three-dimensional color histogram of an RGB color space is generated as to the character color image;
that each of coordinate axes of the RGB color space is divided by n, thereby to create quantized cubelets;
that the number of pixels of the character color image contained in each of the cubelets is counted;
that, in a case where each of the cubelets has a count value which is equal to or larger than count values of the plurality of cubelets surrounding the pertinent cubelet, a value obtained by totalizing all the count values of the surrounding cubelets is set as the count value of the pertinent cubelet; and
that a color belonging to the cubelet of maximum count value is extracted as the maximum frequency color.

10. A computer-readable record medium as defined in claim 1, wherein:
said noise elimination unit generates a character color image by taking a logical product between the telop character image and the telop region image being an original image, so as to obtain an entire average color from the character color image;
said noise elimination unit obtains a regional average color and a regional area for every character pattern of the binary label image, in which pixels of identical label No. are aggregated;
said noise elimination unit calculates a value which is obtained by multiplying a difference of the entire average color and the regional average color by the regional area, as a noise criterion value for every character pattern of the binary label image; and
said noise elimination unit identifies the character pattern whose noise criterion value is larger than a predetermined threshold value, as noise, so as to generate a telop character image in which the noise has been eliminated from the telop character candidate image.

11. A telop character extraction method comprising:
an image input step of receiving a telop region image that contains telop characters cut out from color image data;
a gray-scale image generation step of generating a gray-scale image from the telop region image;
an edge region extraction step of generating an edge region image where an edge is extracted from within the gray-scale image and is inflated;
a histogram creation step of using the edge region image as a mask image, and creating a luminance histogram of pixels of the gray-scale image from the mask image;
a luminance class generation step of dividing a luminance of the luminance histogram into luminance classes;
a character pattern candidate selection step of generating binary images where pixels of luminances belonging to the individual classes are collected for the respective luminance classes, and selecting the binary image of the class of maximum area, as a telop character candidate image; and
a noise elimination step of deciding a character color used in the telop region image, in correspondence with the telop character candidate image, and extracting character pixels corresponding to the character color, from within the telop character candidate image, thereby to eliminate noise pixels and to generate a telop character image.

12. A telop character extraction method as defined in claim 11, wherein:
said edge region extraction step generates an edge image in which the edge has been extracted from within the gray-scale image;
said edge region extraction step binarizes the edge image, thereby to generate an edge binary image; and
said edge region extraction step inflates edge pixels of the edge binary image, thereby to generate the edge region image.

13. A telop character extraction method as defined in claim 11, wherein after having created the luminance histogram, said luminance histogram creation step calculates a moving average value with a plurality of adjacent luminance histogram values, as each luminance histogram value, thereby to smooth the luminance histogram.

14. A telop character extraction method as defined in claim 11, wherein:
said luminance class generation step generates a first luminance histogram which has luminance classes bisected by setting one threshold value on a luminance axis of the luminance histogram, and a second luminance histogram which has luminance classes trisected by setting two threshold values on the luminance axis of the luminance histogram; and
said luminance class generation step compares a histogram value on the threshold value, in the first luminance histogram of the bisected luminance classes, and an average value of histogram values on the two threshold values, in the second luminance histogram of the trisected luminance classes, so as to select the luminance histogram of smaller value.

15. A telop character extraction method as defined in claim 11, wherein:
said character pattern candidate selection step generates binary images in which pixels of luminances belonging to the individual classes are collected for the respective luminance classes;

said character pattern candidate selection step generates binary label images in each of which character patterns are formed by affixing identical label Nos. to continuous pixels;

said character pattern candidate selection step detects the label No. of the character pattern which is contiguous to an outer periphery of the telop region image, from the character patterns contained in each of the binary label images;

said character pattern candidate selection step eliminates character pixels having the detected label No., as background noise;

said character pattern candidate selection step obtains areas of binary images from each of which the background noise has been removed, for the respective classes; and said character pattern candidate selection step selects the binary image of the class of maximum area as a telop character candidate image.

16. A telop character extraction method as defined in claim 11, wherein:

said character pattern candidate selection step calculates line densities of the respective binary level images of the individual classes in a case where the areas of the binary images obtained for the respective classes do not have a large difference; and said character pattern candidate selection step selects the binary image of the class of minimum line density as the telop character candidate image.

17. A telop character extraction method as defined in claim 11, wherein:

said noise elimination step generates a character color image by taking a logical product between the telop character image and the telop character region image being an original image, so as to extract a maximum frequency color; and said noise elimination step extracts character pixels corresponding to the maximum frequency color and eliminates noise pixels from within the telop character candidate image, thereby to generate a telop character image;

wherein said extraction of the maximum frequency color is executed in such a way:

that a three-dimensional color histogram of an RGB color space is generated as to the character color image;

that each of the coordinate axes of the RGB color space is divided by n, thereby to create quantized cubelets;

that the number of pixels of the character color image contained in each of the cubelets is counted;

that, in a case where each of the cubelets has a count value which is equal to or larger than count values of the plurality of cubelets surrounding the pertinent cubelet, a value obtained by totalizing all the count values of the surrounding cubelets is set as the count value of the pertinent cubelet; and that a color belonging to the cubelet of maximum count value is extracted as the maximum frequency color.

18. A telop character extraction method as defined in claim 11, wherein:

said noise elimination step generates a character color image by taking a logical product between the telop character image and the telop region image being an original image;

said noise elimination step obtains an entire average color from the character color image;

said noise elimination step obtains a regional average color and a regional area for every character pattern of the binary label image, in which pixels of identical label No. are aggregated;

said noise elimination step calculates a value which is obtained by multiplying a difference of the entire average color and the regional average color by the regional area, as a noise criterion value every character pattern of the binary label image; and said noise elimination step identifies the character pattern whose noise criterion value is larger than a predetermined threshold value, as noise, so as to generate a telop character image in which the noise has been eliminated from the telop character candidate image.

19. A telop character extraction apparatus comprising:

image input unit for receiving a telop region image which contains telop characters cut out from color image data;

gray-scale image generation unit for generating a gray-scale image from the telop region image;

edge region extraction unit for generating an edge region image where an edge is extracted from within the gray-scale image and is inflated;

histogram creation unit for using the edge region image as a mask image, and for creating a luminance histogram of pixels of the gray-scale image as belonging to the mask image;

luminance class generation unit for dividing a luminance of the luminance histogram into a plurality of luminance classes;

character pattern candidate selection unit for generating binary images where pixels of luminances belonging to the individual classes are collected for the respective luminance classes, and for selecting the binary image of the class of maximum area, as a telop character candidate image; and noise elimination unit for deciding on a character color used in the telop region image, in correspondence with the telop character candidate image, and for extracting character pixels corresponding to the character color, from within the telop character candidate image, thereby to eliminate noise pixels and to generate a telop character image.

* * * * *